(12) United States Patent  
Lammers

(10) Patent No.: US 8,793,096 B2  
(45) Date of Patent: Jul. 29, 2014

(54) SYSTEM AND METHOD FOR POWER AND DATA DELIVERY ON A MACHINE

(75) Inventor: Bryan Gerard Lammers, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 386 days.

(21) Appl. No.: 13/167,859

(22) Filed: Jun. 24, 2011

(65) Prior Publication Data

US 2012/0330597 A1 Dec. 27, 2012

(51) Int. Cl.
G06F 19/00 (2011.01)
G08B 1/08 (2006.01)

(52) U.S. Cl.
USPC .......................................... 702/122; 340/538

(58) Field of Classification Search
USPC .............. 702/122, 44, 57–60, 62–65, 81, 84, 702/108, 113–114, 116–118, 120, 127, 702/182–183, 185, 188–189; 324/500, 503, 324/508, 511–512, 522, 525, 527, 537–539, 324/543, 549, 691; 340/13.23, 425.2, 500, 340/514, 531, 533, 538, 538.11, 538.17; 700/297–298
See application file for complete search history.

(56) References Cited

U.S. PATENT DOCUMENTS

| 4,347,563 | A | | 8/1982 | Paredes et al. |
| 4,956,561 | A | * | 9/1990 | Tamer .......................... 307/10.1 |
| 5,089,974 | A | | 2/1992 | Demeyer et al. |
| 5,727,025 | A | * | 3/1998 | Maryanka ...................... 375/257 |
| 5,745,027 | A | * | 4/1998 | Malville ........................ 375/259 |
| 5,970,430 | A | | 10/1999 | Burns et al. |
| 6,285,966 | B1 | | 9/2001 | Brown et al. |
| 7,262,693 | B2 | | 8/2007 | Karschnia et al. |
| 2004/0032341 | A1 | | 2/2004 | Brenner et al. |
| 2006/0097852 | A1 | | 5/2006 | Lammers et al. |
| 2006/0097864 | A1 | * | 5/2006 | Lammers et al. ........ 340/538.11 |

FOREIGN PATENT DOCUMENTS

EP 0160167 6/1985

* cited by examiner

Primary Examiner — Toan Le
(74) Attorney, Agent, or Firm — Liell & McNeil

(57) ABSTRACT

A power and data delivery system includes a conductor for transferring both power and data, a plurality of device connectors, which each define at least one of a power link and a communication link, and a plurality of smart connectors connecting the conductor with the device connectors. Each of the smart connectors includes a memory having a device testing algorithm stored thereon, and a processor configured to execute the device testing algorithm. The device testing algorithms, which are executed simultaneously, are configured to evaluate a plurality of characteristics, including a current and voltage, associated with one or both of the power link and the communication link.

20 Claims, 17 Drawing Sheets

SYSTEM AND METHOD FOR POWER AND DATA DELIVERY ON A MACHINE

TECHNICAL FIELD

The present invention relates generally to a power and data delivery system for transferring power and data to a plurality of electrical devices through respective smart connectors and device connectors, and more particularly to device testing algorithms executed simultaneously on each smart connector for evaluating a plurality of characteristics of the respective device connector.

BACKGROUND

Machines are used to perform a wide variety of job functions, and may be mobile or stationary. For example, a typical machine is shown in FIG. 1 as a wheel loader, and is used for many earthworking and construction tasks. Other types of machines may include trucks, automobiles, marine craft, aircraft, dozers, graders, excavators, tractor trailers, trains, stationary electric power generators, and many others.

Typically, machines are powered, controlled and monitored using electric and electronic technology, which involves the use of electrical conductors to supply power and data to various components and locations. Traditionally, power and data are delivered on separate conductors. In machines such as this, an operator may control devices from a central location with data routed through independent data conductors dedicated to each device. Similarly, the power for any of these machines would normally originate at a power source and connect to a central location, typically a fuse block, for independent distribution on power conductors to locations throughout the machine.

In current systems, two or more conductors are required for each device. The total number of conductors required increases proportionally to the number of devices used by the machine, and the number is ever increasing. Future machines will require even more devices than do present machines. To minimize assembly problems on current machines, the conductors are bundled into complex and cumbersome wiring harnesses. With a larger number of conductors, the wiring harnesses become proportionally larger and proportionally harder to route around the machine. The cost and weight of the wiring harnesses also increases proportionally and the time to troubleshoot increases exponentially. For ease of assembly, harnesses use connectors. Large harnesses require large and expensive connectors. The addition of even one new device may require harness replacement or modification. Even when the desired conductors for service or modification are found, they may not be in a convenient location to perform the needed work to connect to the new device. Unfortunately, because of the ever-increasing percentage of machine functions being performed electronically, the problems will only continue to multiply.

Multiplexing has been used to try to reduce the number of individual conductors needed for electrical communication. Multiplexing is typically used to send multiple messages on a single pair of signal conductors to separate or independent receivers of electrical data. However, present day techniques of multiplexing groups of electrical functions are only partially solving system complexity problems and are merely creating additional layers of electrical hierarchy rather than reducing complexity of the electrical systems. Although these systems and methods may be adequate for the speed and bandwidth of some of today's electrical functions, speed and capacity become a significant problem as signal activity continues to increase.

Attempts have also been made to use a data communication system where data and power are routed over the same conductors. For example, it is known in motor vehicles to arrange functional devices to communicate with each other through supply conductors connected to the battery of the vehicle by means of a carrier current technique. One such example of a data communication system employing the use of carrier currents is disclosed by U.S. Pat. No. 5,745,027, to Malville. Malville, however, does not disclose features which would enable a combination of power and data delivery throughout a machine. For example, Malville does not disclose smart connectors that connect devices to a wire bus that are configured to communicate and work with other smart connectors. Malville also does not disclose techniques in which smart connectors are readily connected to the bus at any desired location during assembly, maintenance or upgrades. Furthermore, Malville does not disclose techniques for delivering large amounts of data over a combined power and data delivery bus that accounts for and compensates for data interference in harsh environments.

In U.S. Pat. No. 5,727,025, Maryanka discloses a system that allows for voice, music, video and data to be transmitted over direct current wires. The system of Maryanka, however, does not disclose the use of smart connectors in that the interface between devices and the direct current wires has no capability to interpret commands and control devices based on decision making Maryanka's system also does not include techniques for smart connectors being readily connected at any desired locations on the direct current lines.

SUMMARY OF THE DISCLOSURE

In one aspect, a power and data delivery system includes a conductor for transferring both power and data, a plurality of device connectors, which each define at least one of a power link and a communication link, and a plurality of smart connectors connecting the conductor with the device connectors. Each of the smart connectors includes a memory having a device testing algorithm stored thereon, and a processor configured to execute the device testing algorithm. The device testing algorithms, which are executed simultaneously, are configured to evaluate a plurality of characteristics, including a current and a voltage, associated with one or both of the power link and the communication link.

In another aspect, a machine includes an electronically controlled engine mounted on a frame, and operably coupled to an alternator. A battery is supported on the frame and is electrically connected to the alternator by a charging circuit. A starter is operably coupled to the engine, and electrically connected to the battery by a starter circuit. A conductor for transferring both power and data is supported by the frame, and is electrically connected to the battery by a regulator circuit. A plurality of electrical devices are electrically connected to the conductor by a device connector, which defines at least one of a power link and a communication link, and a smart connector. Each smart connector includes a memory having a device testing algorithm stored thereon, and a processor configured to execute the device testing algorithm. The device testing algorithms, which are executed simultaneously, are configured to evaluate a plurality of characteristics, including a current and a voltage, associated with one or both of the power link and the communication link.

In yet another aspect, a method of operating a machine includes electrically connecting a battery to a conductor, which is configured to transfer both power and data, by changing a state of a regulator circuit. A starter engages an engine of the machine responsive to changing a state of a starting circuit. The engine of the machine is then started. The battery is charged with power from a charging circuit electrically connected to an alternator coupled to the engine. A plurality of electrical devices receive electrical power from the conductor through a respective smart connector and a respective device connector. A device testing algorithm is simultaneously executed on each smart connector to evaluate a plurality of characteristics, including a current and a voltage, associated with at least one of a power link and a communication link of the respective device connector.

DETAILED DESCRIPTION

Reference will now be made in detail to embodiments of the invention, examples of which are illustrated in the accompanying drawings. Whenever possible, the same reference numbers will be used throughout the drawings to refer to the same or like parts.

Figure 1:
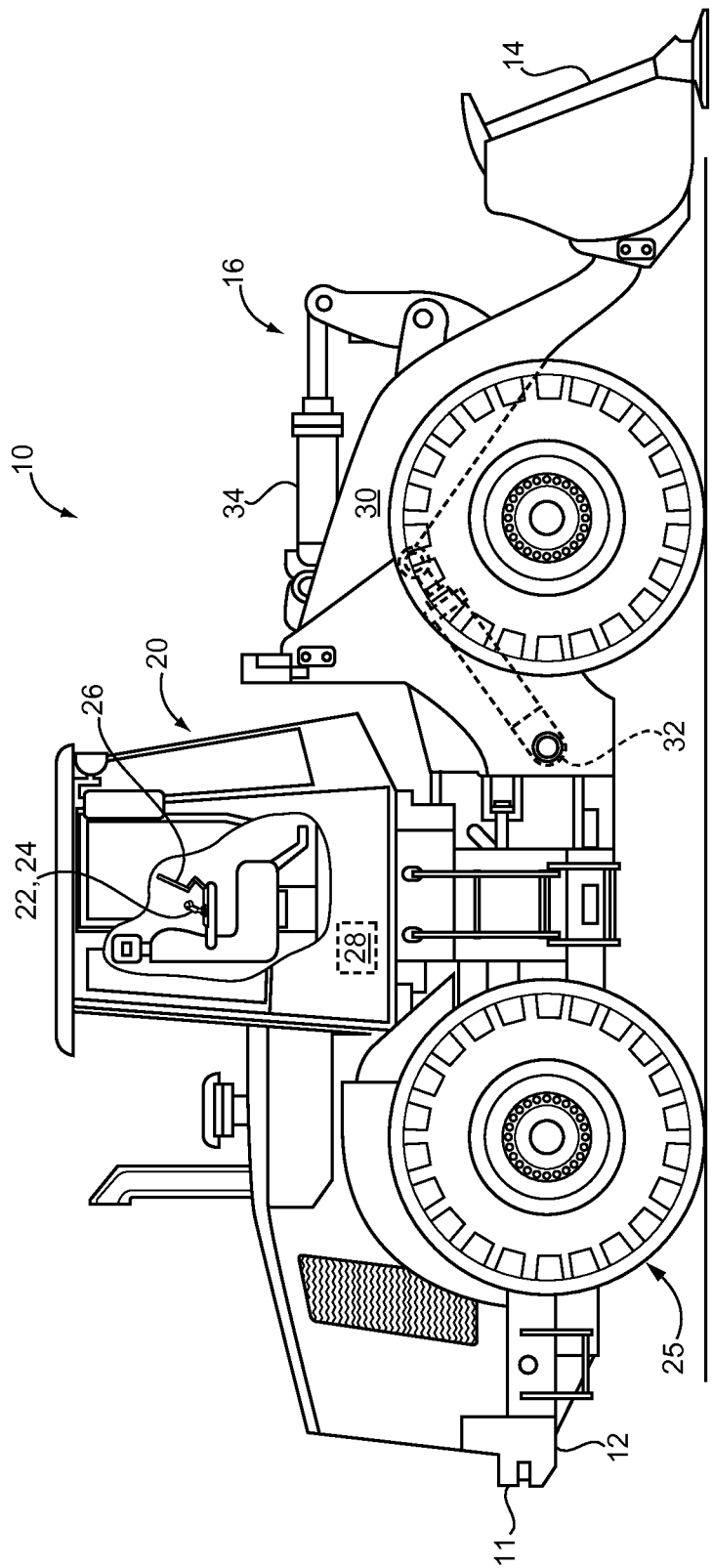
FIG. 1 shows a diagrammatic illustration of a machine where one embodiment of the present disclosure may be employed.

FIG. 1 shows a diagrammatic illustration of a machine 10 where one embodiment of the present disclosure may be employed. Although the machine 10 is shown as a wheel loader, the machine 10 may be any kind of mobile or stationary machine that includes a frame 12 that supports an electronically controlled engine, and generally has a need for data communications and power to be transmitted from one area on the machine 10 to another to enable the execution of an operation. For example, mobile machines, where the frame 12 is supported by a propulsion system 25, may include wheel loaders, excavators, track type loaders, dump trucks, garbage trucks, marine propulsion systems, locomotives, etc. Stationary machines may include power generation systems, machining systems or other manufacturing tools and systems, etc. In the illustrated example, frame 12 may be said to include an operator station 20 and chassis 11.

The machine 10 displayed in FIG. 1 is shown having a variety of devices 60, including a power source, such as an electronically controlled engine 13 (see FIG. 11), an implement 14, a lift mechanism 16, and an operator control station 20. The operator station 20 may include additional devices 60, such as a lift control device 22, a steering control device 24, and a display 26. The lift control device 22 and steering control device 24 may be a single device or separate devices to control lift and steering functions on the machine. The operator station 20, although shown here as being on a chassis 11 of the machine 10, may be on the machine itself or at a location remote from the machine 10. The machine 10 may also include at least one controller 28, the controller also being a type of device 60. The controller 28 preferably includes programming specific to the machine 10, but it should be appreciated that various aspects of the controller 28 may be common to all machines 10. The controller 28 may be microprocessor based, as is known in the art. In addition, the controller 28 may be one of a number of controllers for controlling different functions. The controller 28 may also control subservient controllers.

The machine 10 may have an implement 14 controllably attached to the machine 10 by the lift mechanism 16. The lift mechanism 16 may include a lift linkage 30 that may be hydraulically actuated by one or more hydraulic cylinders. In particular, lift linkage 30 and implement 14 may be controlled by lift cylinder 32 and tilt cylinder 34 to lift and tilt the implement 14.

Figure 2:
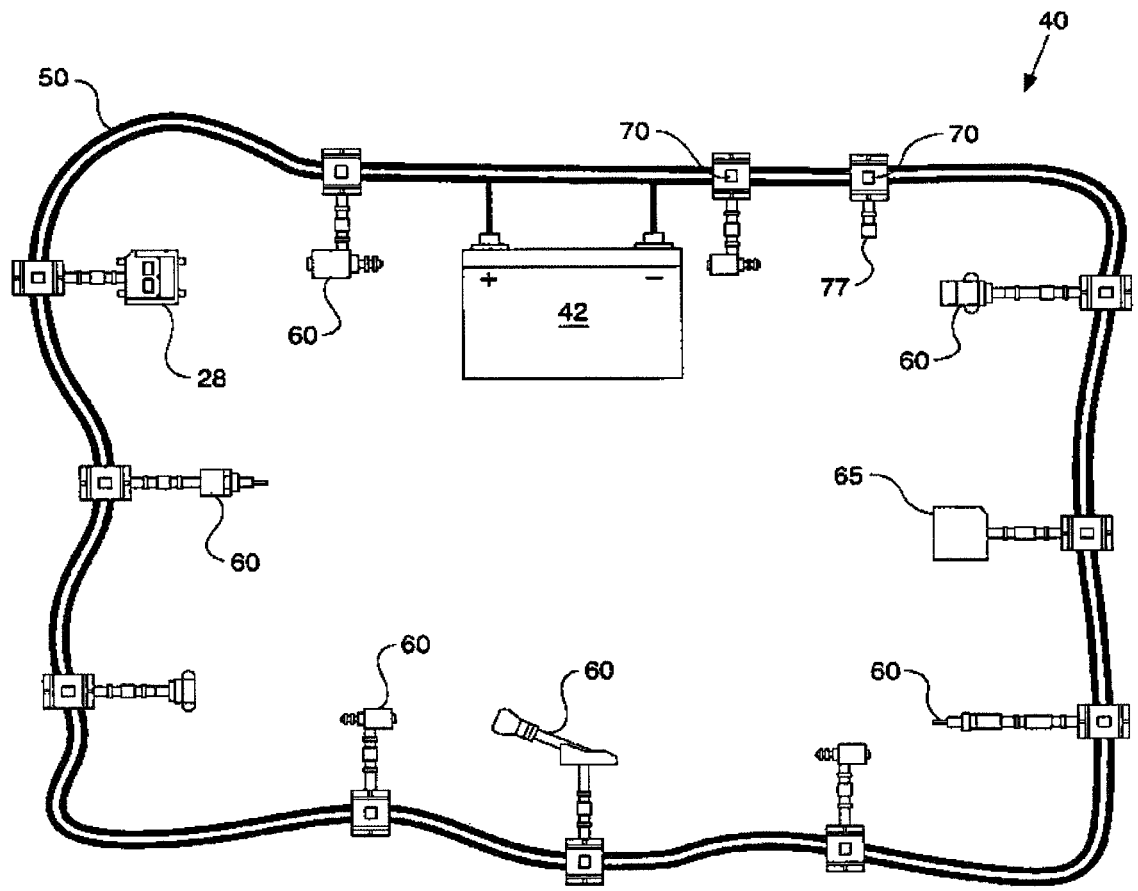
FIG. 2 shows diagrammatically a power and data delivery system according to one embodiment of the present disclosure.

FIG. 2 shows diagrammatically a power and data delivery system 40 according to one embodiment of the present disclosure. The power and data delivery system 40 is arranged throughout the machine 10 and is connected to a power supply 42. The power and data delivery system 40 may include conductors such as a two-wire configuration, but may also include other configurations including, but not limited to, a one-wire configuration, for example with a common chassis ground. The power and data delivery system 40 may be arranged such that a conductor 50 is operably connected to all devices 60 requiring communication with the controller 28 or with other devices 60, and also requiring power from the power supply 42. The transfer of data and power preferably occurs over the same conductor 50. In addition to the devices 60 mentioned above, devices 60 may include, but are not limited to, solenoids, sensors, relays, throttle shifters, lights, alarms, and any other electrical device that may be present on the machine 10 or other machines. Devices 60 are operably connected to the conductor 50 via smart connectors 70. A smart connector 70 may also be characterized as a processing node. Each device 60 may have its own smart connector 70, as shown in FIG. 2.

Alternatively, the power and data delivery system 40 may be arranged and utilized on a portion of the machine 10. This may occur where new devices 60 are added to a machine 10 already having a wiring setup, such as a wiring harness. Furthermore, multiple systems 40 may be used on a machine 10. For example, a first system may be installed for the operator station of the machine 10 while a second system 40 may be installed for the rest of the machine 10. Similarly, separate systems 40 may also be used for cooling systems, implements, and the like. The systems 40 may then be connected to one another via smart connectors 70.

Figure 3:
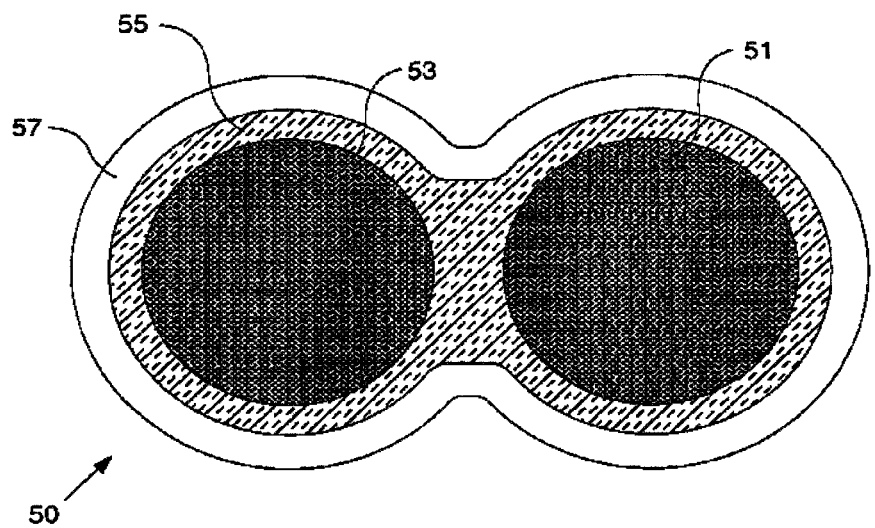
FIG. 3 is a cross section diagram of a conductor according to one embodiment of the present disclosure.

FIG. 3 is a cross section of the conductor 50 according to one embodiment of the present invention. The conductor 50 comprises a positive line 51 and a negative line 53. Each of the positive and negative lines 51, 53 may be made from a finely stranded material, such as copper, aluminum, or other material. The positive and negative lines 51, 53 may be disposed within an insulation 55 that electrically insulates and protectively surrounds the positive and negative lines 51, 53. Sheathing 57 may be arranged about the insulation 55 for an additional layer of protection from abrasion as well as to prevent electro-magnetic interference (EMI) or emissions. Alternatively, the insulation 55 and sheathing 57 may be integrated as one component. Together, conductors 51 and 53 can be considered to be a two wire power and data bus.

Figure 4:
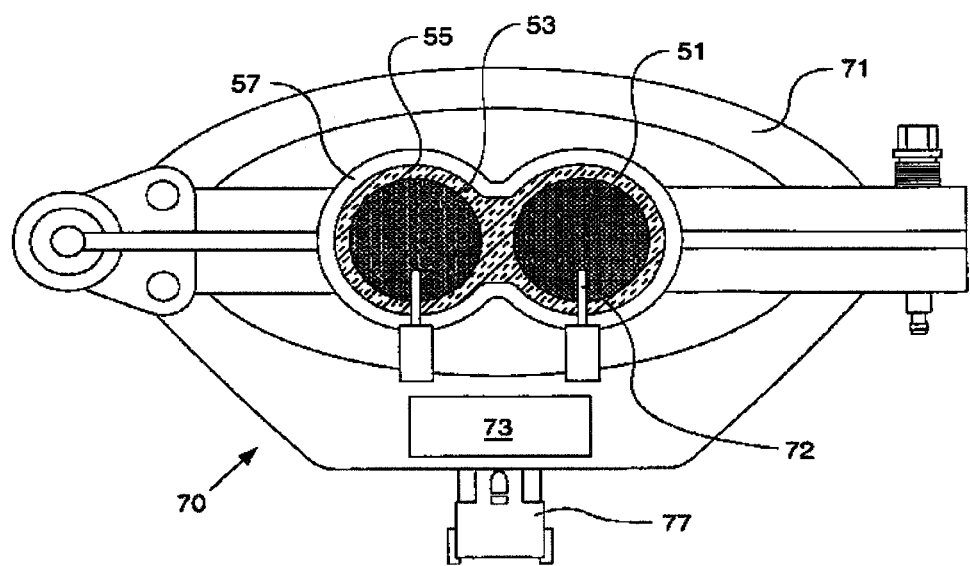
FIG. 4 is a cross section view of a smart connector plugged into the conductor according to one embodiment of the present disclosure.

FIG. 4 is a cross section view of a smart connector 70 connected to the conductor 50 according to one embodiment of the present disclosure. The smart connector 70 may comprise a housing 71, prongs 72, a smart chip 73 (Power Line Communication Chip, PLC Chip), and a device connector 77. The smart connector 70 may be connected to the conductor 50 at any location along the conductor 50 where it may be desired to connect a device 60. The connection of a smart connector 70 may occur during assembly of the machine 10 or at a later time, such as when a new device 60 may be added.

Connection of the smart connector 70 to the power and data conductor 50 may require that the smart connector 70 have at least one prong 72 that may penetrate the insulation 55 and sheathing 57 of the conductor 50 and independently contact a corresponding at least one of the positive and/or negative lines 51, 53. As shown in FIG. 4, there are 2 prongs 72, one prong 72 to contact the positive line 51 and one prong 72 to contact the negative line 52.

Ensuring a proper connection may include techniques such as clearly marking the conductor 50 and the prongs 72 with positive or negative markings, color codes or other types of markings so that the correct polarity between the contacts is made. In one embodiment of the disclosure, the prongs 72 may assume the shape of knife-like structures with a predetermined curvature for easier penetration into the conductor 50. The use of finely stranded lines in the conductor 50 allows the prongs 72 to readily penetrate into the positive and negative lines 51, 53 for enhanced electrical contact. The housing 71 may also allow for a predetermined offset of the prongs 72 from the conductor 50 such that assembly of the housing 71 about the conductor 50 will ensure a proper depth of penetration of the prongs 72 into the conductor 50.

Although the prongs 72 may be required to penetrate the sheathing 57 and insulation 55, various techniques may be used to establish a good connection. To prevent electrical continuity between prongs 72, it may be desired to coat the prongs 72 such that only the part of the prong 72 penetrating the conductor 50 into the stranded portion is conductive. This may be done using coatings and the like about the part of the prong 72 that may be in contact with the sheathing 57 or insulation 55. For example, a coating may be applied to portions of the prongs 72 that may be in contact with the sheathing 57 or insulation 55 or a coating may be applied to all but the end of the prongs 72. The coating should be a material that provides electrical insulation.

The smart connector 70 may be configured such that a sealant, e.g., a gel-like substance, may be located on the smart connector 70 and released during the connection process to completely seal the connection from the environment as the housing 71 closes about the conductor 50. The sealant may also be capable of coating portions of the prongs 72 as they penetrate into conductor 50 thereby providing insulation of a portion of each prong 72. Alternatively, the sealant may be located within the conductor 50, for example between the sheathing 57 and the insulation 55. If the sheathing 57 becomes exposed to the environment, the sealant at that location may harden and thus provide a barrier to maintain the integrity of the conductor 50. Using a sealant that may be of a material that hardens upon exposure to air may also prevent physical damage in case the sheathing 57 becomes frayed.

Design of the conductor 50 and the smart connector 70 may also allow for various configurations of the conductor 50 within the housing 71. The conductor 50 and the housing 71 may be configured such that the positive line 51 may only fit on one side of the housing 71 and the negative line 53 may only fit on the other side of the housing 71, thus allowing only for a proper polarity connection. Alternatively, the housing 71 may be configured such that connection to the conductor 50 may be made with the positive and negative lines 51, 53 contacting either prong 72.

The smart connector 70 may be secured to the conductor 50 in any number of ways, including, but not limited to, adhesive, screws, bolts, clips, and the like. Securing the housing 71 to the conductor 50 by one of the above methods preferably maintains adequate connection in harsh environments.

Properly securing the housing 71 about the conductor 50 may equalize the compressive forces on the finely stranded wire bundle and may result in an overall stiffer region of the conductor 50. Having a stiffer region where the prongs 72 penetrate the conductor 50 may result in a reduction of fretting corrosion between the prongs and the finely stranded wire bundle of the conductor 50.

Figure 5A:
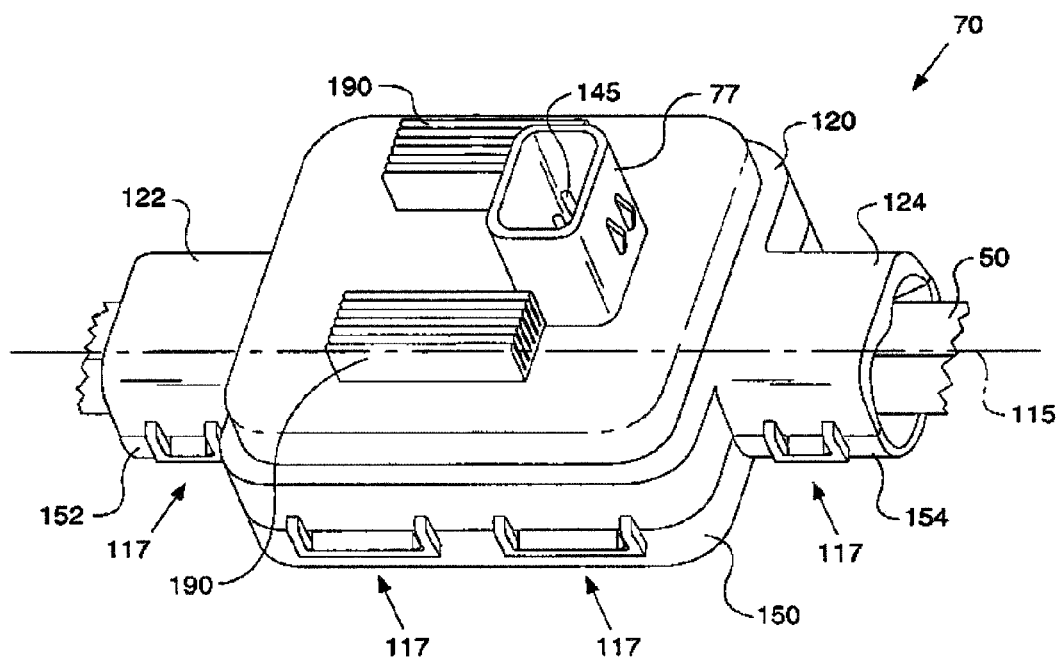
FIG. 5a is a perspective view of a smart connector according to another embodiment of the present disclosure.

FIG. 5a is a perspective view of a smart connector 70 according to another embodiment of the present disclosure. This embodiment of the smart connector 70 may include a connector top housing 120 and a connector base housing 150 and may be connected at any location along the conductor 50 where it may be desired to connect a device. The connection may occur during assembly of the machine 10 or at a later time, such as when a new device 60 may be added.

The conductor 50 is shown extending from top housing first and second ends 122,124 and corresponding base housing first and second ends 152,154. The conductor 50 may be configured to extend along a longitudinal axis 115. The top and base housings 120,150 may also be configured to extend along this same longitudinal axis 115. A connector interface or a device connector 77 is shown protruding from the top housing 120 transverse the longitudinal axis 115 of the conductor 50. Although a single device connector 77 is shown, there may be additional device connectors 77 extending off the smart connector 70 to accommodate additional connections to the power and data conductor 50. The device connector 77 may also be configured to receive at least one connector pin 145 that may also extend transverse the longitudinal axis 115 of the conductor 50. While typical device connectors 77 may have three connector pins 145, the total number of connector pins 145 may be more or less than this.

The smart connector 70 may also be secured such that the top and base housings 120,150 provide a seal about the conductor 50. Although FIG. 5a depicts the top and base housings 120,150 being attached utilizing a plurality of mating clips 117, the top and base housings 120,150 may be attached in any number of ways, including, but not limited to, adhesive, screws, bolts, clips, and the like.

Figure 5B:
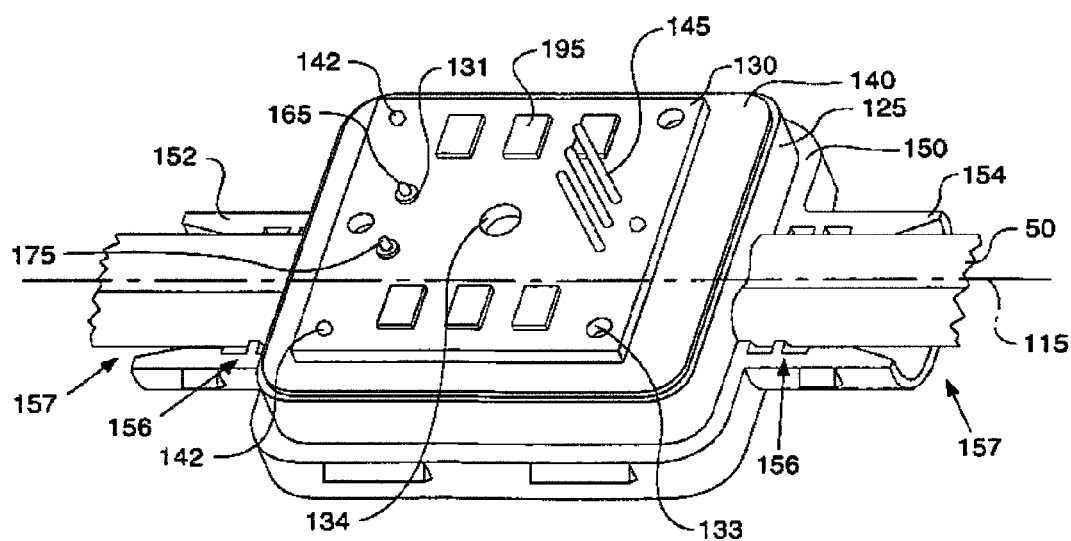
FIG. 5b is a perspective view of the smart connector in FIG. 5a with a connector top housing removed.

FIG. 5b is a perspective view of the smart connector in FIG. 5a with the connector top housing removed showing a circuit board 130, an intermediate layer 140, and a top housing seal 125. The intermediate layer may be any layer providing separation between the top housing 120 and base housing 150, and may be known as a potting layer. The top housing 120, circuit board 130, potting layer 140, and top housing seal 125 may all come pre-assembled such that the top housing 120 may be connected to the base housing 150 in a single step. The top housing seal 125 may be seated in a groove (not shown) in the top housing 120. Additionally, a portion of the area between the potting layer 140 and the top housing 120 may be filled with a potting material (shown in FIGS. 5f and 5g as 135) to surround the circuit board 130. The potting material 135 may be any material known in the art for use as a potting material 135. The potting layer 140 may then provide the separation between the top housing 120 and the base housing 150.

The circuit board 130 may have prong contacts 131 positioned to receive first and second contact prongs 165,175 through the potting layer 140. At least one connector pin 145 may also be attached to the circuit board and may be positioned to be received by the device connector 77. Locating apertures 133 may be configured in the circuit board 130 for receiving locating pins 142 from the potting layer 140 and locating pins (not shown) from the top housing 120. A potting aperture 134 may be located in the circuit board 130 for possible injection of the potting material.

Any of a variety of features may be included as part of circuit board 130 depending on the complexity of the smart connector 70. The circuit board 130 may contain, for instance, a number of devices, such as, but not limited to, processors, transmitters, receivers, contact devices, an output driver, a heat sink, an input filter, etc. For mere electrical conveyance, a circuit board 130 may not be used, such as a communication link to an electronic control module. For more complex applications, the circuit board 130 may have heat generating devices (not shown) that may require heat sink contacts 195 to conductively transfer heat to heat sinks 190 mounted external to the top housing 120.

Figure 5C:
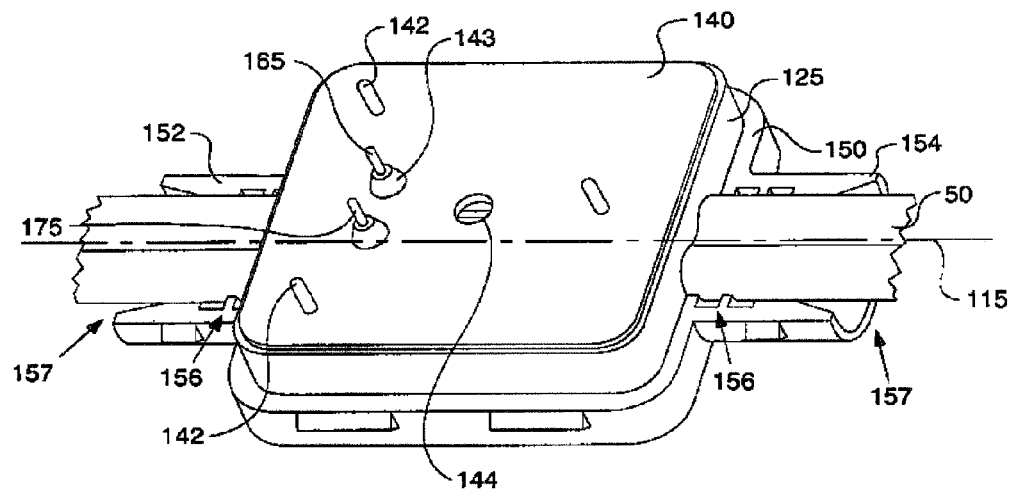
FIG. 5c is a perspective view of the smart connector in FIG. 5a with a connector top housing and a circuit board removed.

FIG. 5c is a perspective view of the smart connector 70 in FIG. 5a with the connector top housing 120 and circuit board 130 removed showing the potting layer 140. The potting layer 140 may have locating pins 142 that may be received by locating apertures 133 in the circuit board 140. The potting layer 140 may also have a potting aperture 144 that lines up with the circuit board potting aperture 134 for injection of the potting material. The potting layer 140 may also have prong guides 143 to receive contact prongs 165,175 through the potting layer 140.

Figure 5D:
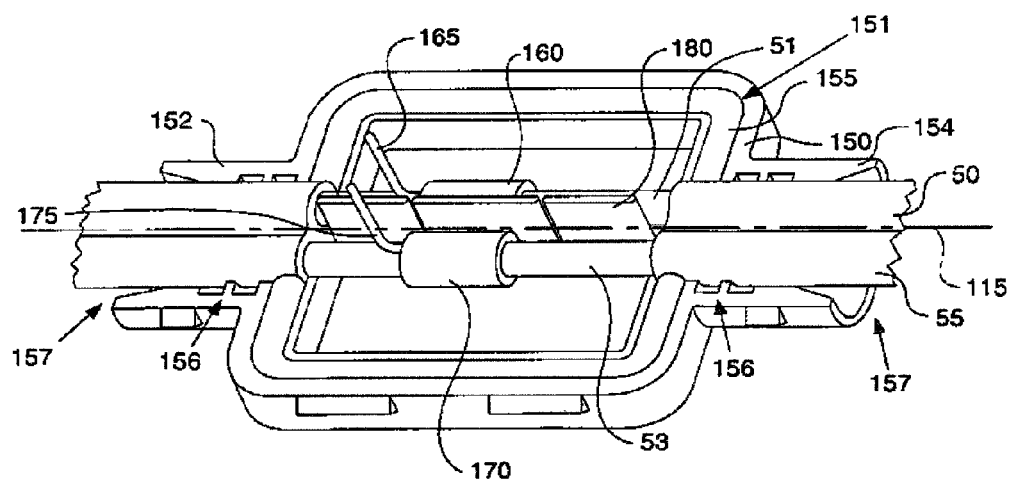
FIG. 5d is a perspective view of the smart connector in FIG. 5a with a connector top housing, circuit board and potting layer removed.

FIG. 5d is a perspective view of the smart connector 70 in FIG. 5a with the connector top housing 120, circuit board 130, and potting layer 140 removed showing the conductor 50 arranged along the longitudinal axis 115 of the smart connector 70. The base housing 150 is shown to have first and second ends 152,154. Each of the first and second ends 152,154 is shown to have a base conductor channel 157 to receive and locate the conductor 50. The base conductor channels 157 may have a base clamping portion 156 that may engage the insulation 55 of the conductor 50. Although the base clamping portion 156 is shown here as ribs or risers, the base clamping portion 156 may be configured using any of a number of ways known in the art to engage the conductor 50. Each of the base conductor channels 157 in the first and second ends 152,154 may also be outwardly flared about the conductor 50. The base housing 150 may also have a groove 151 to receive a base housing seal 155 and to engage the conductor 50.

As is shown in FIG. 5d, a portion of the insulation 55 has been removed to expose the positive and negative lines 51,53 of the conductor 50. Removal of the insulation 55 may be accomplished in any of a number of ways. A conductor contact 160,170 may be attached to each corresponding line 51,53 of the conductor 50 in any of a number of ways, such as crimping, welding, soldering, and the like. Each conductor contact 160,170 may have a corresponding prong 165,175 extending transverse the longitudinal axis 115. A conductor partition 180 may positioned in the base housing 150 between the positive and negative lines 51,53 of the conductor 50.

Figure 5E:
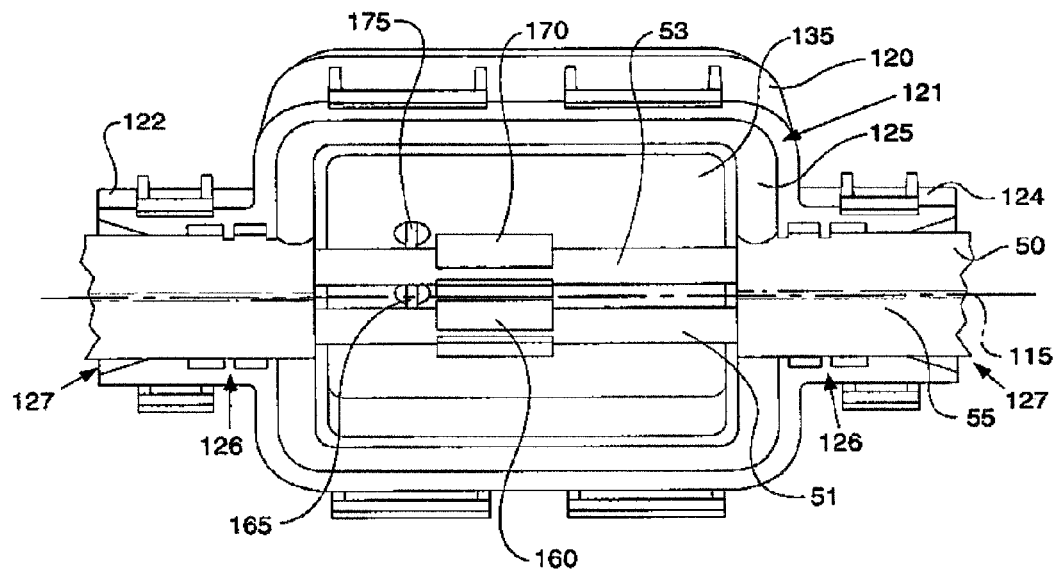
FIG. 5e is a perspective view of the smart connector of FIG. 5a with a connector base housing removed.

FIG. 5e is a perspective view of the smart connector 70 of FIG. 5a with the connector base housing 150 removed. The top housing 120 is shown to have first and second ends 122, 124. Each of the first and second ends 122,124 is shown to have a top conductor channel 127 to receive and locate the conductor 50. The top conductor channels 127 may have a top clamping portion 126 that may engage the insulation 55 of the conductor 50. The top conductor channels 127 and clamping portions 126 may be configured to correspond to the base conductor channels 157 and clamping portions 156. Each of the top conductor channels 127 in the first and second ends 122,124 may also be outwardly flared about the conductor 50 corresponding to the base conductor first and second ends 152,154. The top housing 120 may also have a top housing seal 125 in a groove 121 that may correspond to the base housing seal 155 and may be configured to engage the base housing seal 155 and the conductor 50.

Figure 5F:
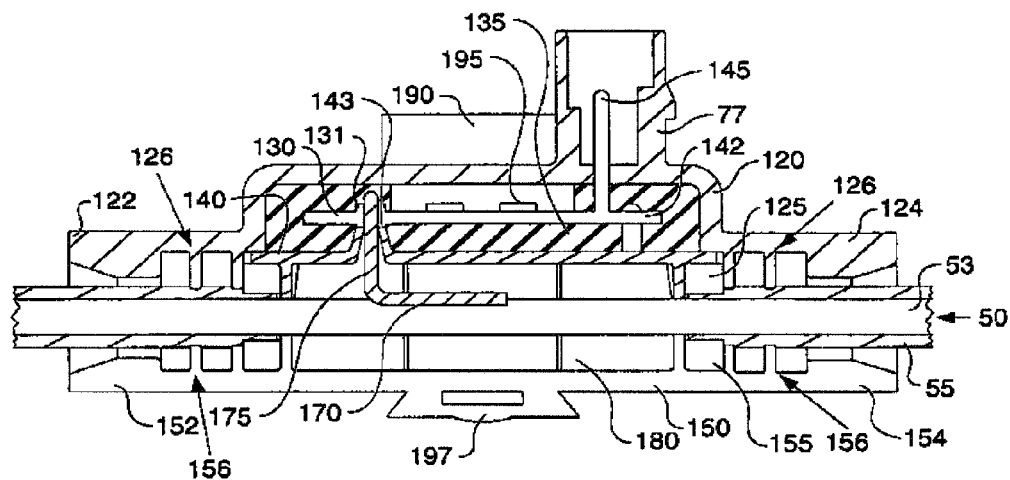
FIG. 5f is a cross section diagram of the smart connector of FIG. 5a parallel to the conductor.
Figure 5G:
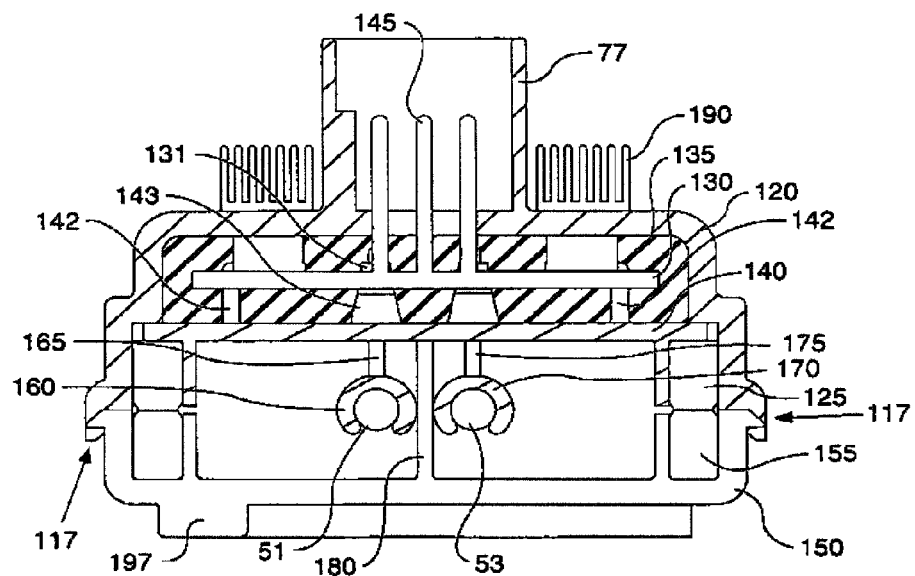
FIG. 5g is a cross section diagram of the smart connector of FIG. 5a perpendicular to the conductor.

FIGS. 5f and 5g are respective cross section diagrams of the smart connector 70 of FIG. 5a parallel to and perpendicular to longitudinal axis 115 of the conductor 50. Although the potting material 135, as mentioned above, is shown to be present in the space between the top housing 120 and the potting layer 140, the potting material 135 may be used in any portion of the connector 50.

FIGS. 5f and 5g also show a connector mount 197 on a surface of the base housing 150. The smart connector 70 may be mounted to a machine or other structure in one of a number of ways in the art, including by adhesive, straps, mechanical means, and the like. This may depend on the materials used to construct the top and base housings 120,150 of the smart connector 70.

The smart connector 70 may connect to and make electrical contact with a device 60 by way of a device connector 77. The device connector 77 may be a pigtail connector or some other such connector suitable for the task. Alternatively, the device 60 may be connected to a smart chip 73a directly without any intermediate connector.

Figure 6A:
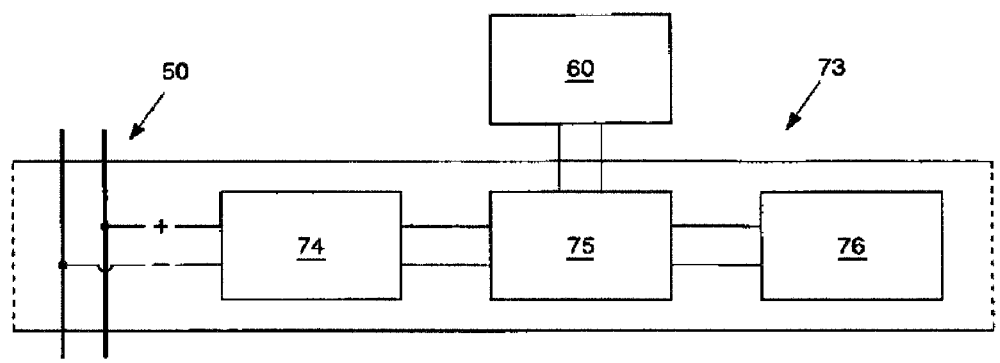
FIG. 6a is a block diagram of a smart chip connected to the conductor according to one embodiment of the present disclosure.

FIG. 6a is a block diagram of a smart chip 73 connected to the conductor according to one embodiment of the present disclosure. The smart chip 73 may comprise an optional contact device 74, a receiver/transmitter 75 and a processor 76. The contact device 74 may be located on the smart connector 70 to sense voltage polarity and may either provide an indication of a correctly polarized connection or reverse the polarity if not correct.

The processor 76 may be programmed from a controller 28 through the receiver/transmitter 75, may be pre-programmed to recognize connection to a new device 60, may be programmed from the device 60 itself, or may be programmed utilizing any other device 60 having programming capability. A message may then be sent to a display 26 notifying the operator of a changed condition based on the programming. The changed condition may then be approved or denied based on an operator input or a predetermined system protocol. The smart connector 70 may then be enabled to communicate information through the conductor 50.

The smart connector 70 may transmit commands, inquiries, or other data to the device 60, and also receive data from the device 60. The smart connector 70 may then communicate by way of the conductor 50 to other smart connectors 70, devices 60, or the controller 28. When a communication is sent over the conductor 50, the communication may be available for all smart connectors 70 to review. However, only the smart connector 70 to which the communication is addressed will normally utilize the information. Although the signal may attenuate over time, the communication may remain on the conductor 50 indefinitely until filtered out by a signal attenuation device 65. The signal attenuation device 65 may filter or impede communications over a period of time such that the communication may be attenuated to an insignificant value, leaving the bandwidth of the conductor 50 available for new communications.

The smart connector 70 or the smart chip 73 may be available as off the shelf products. Thus, the smart connector 70, by use of standard components, may be a generic, interchangeable product.

The smart connector 70 may have built-in current limiting capabilities. The processor 76 may be programmed such that it may detect the current flowing to the device 60 and determine if the current is within tolerance. If the current is not within tolerance, the processor 76 may then stop or limit current flow to the device 60. The processor 76 may also send an out of tolerance message to an operator. Alternative means for limiting current flow may be used, such as resistors, capacitors, transistors, fuses, breakers, shunt devices, and the like.

The processor 76 may be programmed such that it may send communications over the conductor 50 on a predetermined frequency or a whole set of predetermined frequencies. This predetermined frequency may be operator selected based on a desired frequency, may be selected based on available bandwidth, or may be selected based on some other criteria, such as system condition, location, available communication means, regulated restrictions, and the like. Alternatively, the communication may be sent in multiple redundant packets using a plurality of frequencies or a plurality of communication protocols.

Figure 6B:
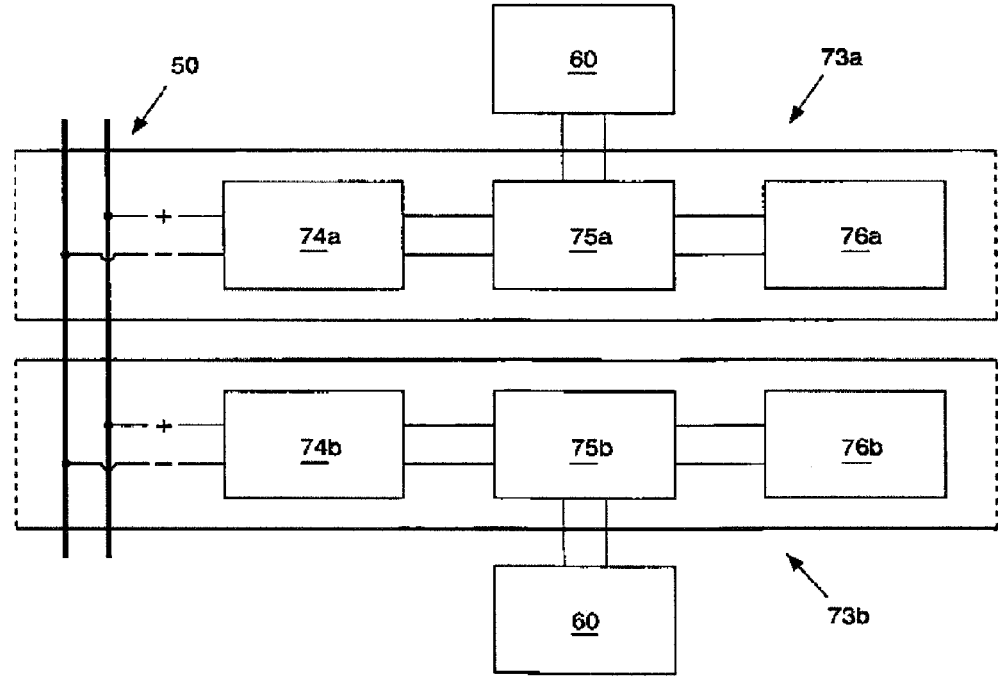
FIG. 6b is a block diagram of two smart chips connected to the conductor according to one embodiment of the present disclosure.

FIG. 6b is a block diagram of two smart chips 73a, 73b connected to the conductor 50 according to one embodiment of the present disclosure. A first processor 76a may send redundant packets to a second processor 76b. The second processor 76b receiving the redundant packets may compare the multiple communications for data integrity. The data may be considered completely and accurately delivered based on comparing the multiple communications with each other. For example, the communication may be sent redundantly over three separate frequencies, and a data match of at least two communications may indicate successful transmission. The number of required matches may depend on the type of data, the importance of the data, the speed required for data transfer, system conditions, external conditions, and the like. The second processor 76b, upon determining a successful transmission of data, may send a confirmation of data received. The confirmation may be sent to the first processor 76a or to a display 26 to provide notice to an operator. If the transmission of data is determined to be unsuccessful, i.e. the required number of matches is not received, the second processor 76b may notify either the first processor 76a, the operator, a designated source, or the like. In addition, the second processor 76b may ask for a re-transmission of the data. Because of either the lack of confirmation, a request for re-transmission, etc., the first processor 76a may recognize that the data is not being received by the second processor 76b and may then choose to send the data over different frequencies or in differing numbers of packets. This may continue until the data is received, the request is canceled, the operator is notified of the condition, and the like.

The display 26 may be configured to provide real-time, visual feedback on machine operating conditions. This may be used to ensure the best performance of the machine 10 and to assist in troubleshooting. The conductor 50 allows for multiple communication data links to be utilized in providing real-time performance and operating information while the machine 10 is in use. Alternatively, the information may be logged for future review. The display 26 may also be capable of showing one or more of the devices 60 that may be connected to the machine 10. This display 26 may also be configurable or re-configurable without changing out the hardware. Re-configuration may allow changes to the display 26 without utilizing additional current carrying devices.

Figure 7:
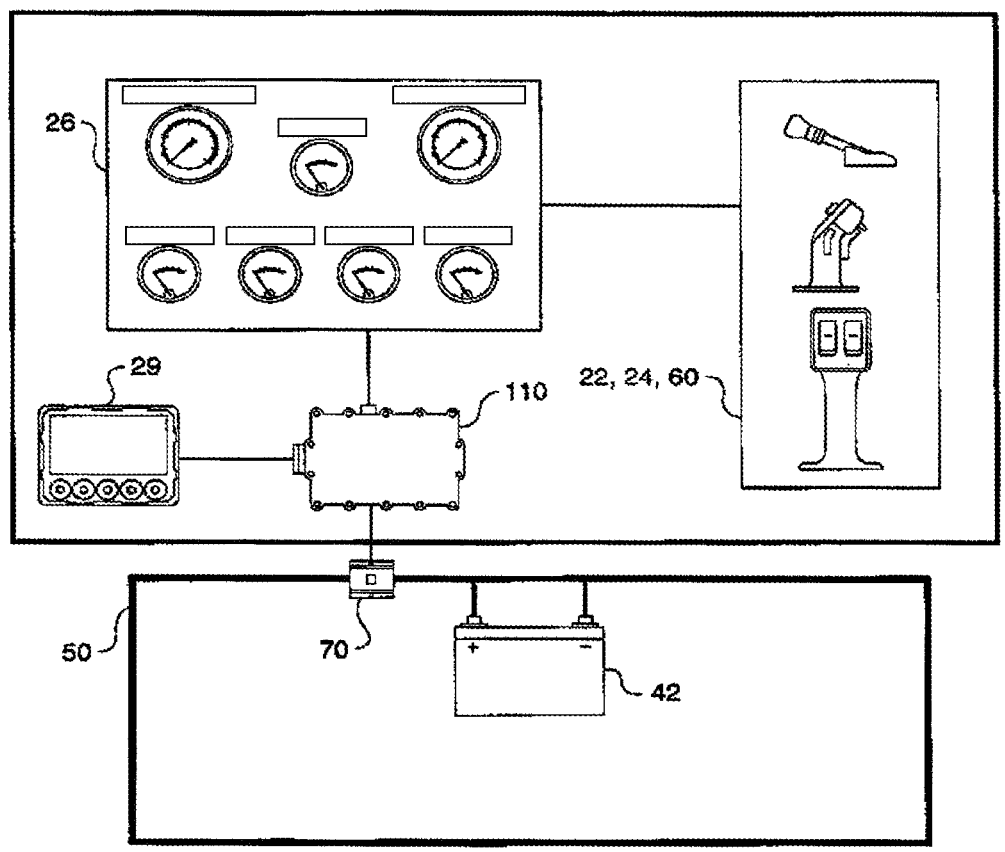
FIG. 7 shows diagrammatically a power and data delivery system according to another embodiment of the present disclosure.

FIG. 7 shows diagrammatically a power and data delivery system 40 according to another embodiment of the present disclosure. In this embodiment, one smart connector 70 on the conductor 50 is connected to an operator interface station 100. The operator interface station 100 comprises an operator interface controller 110, a display 26, operator control devices 22, 24, 60, and software loading interface 29.

The software loading interface 29 may be available to allow an operator to load software and configure or reconfigure new and existing devices 60. The software loading interface 29 may also indicate the software programmed in each smart connector 70. Alternatively, this may be done automatically as mentioned above as devices 60 are connected to the conductor 50.

The display 26 in this embodiment may comprise a virtual dashboard display. The virtual display 26 may be configured to display various machine operator conditions, including RPM, speeds, temperatures, battery information, fuel indications, and the like. The display 26 may come pre-programmed from the manufacturer and have various configurable setups to select from or may be configurable to the owner's or operator's preferences. A virtual dashboard display 26 may eliminate the need for dedicated inputs. This may provide for reduced electrical power consumption, less wiring, and a greater overall system capacity. The display 26 may also be all or partly software based. This allows for the monitoring or control equipment to be consistent across product lines and machines.

Figure 8:
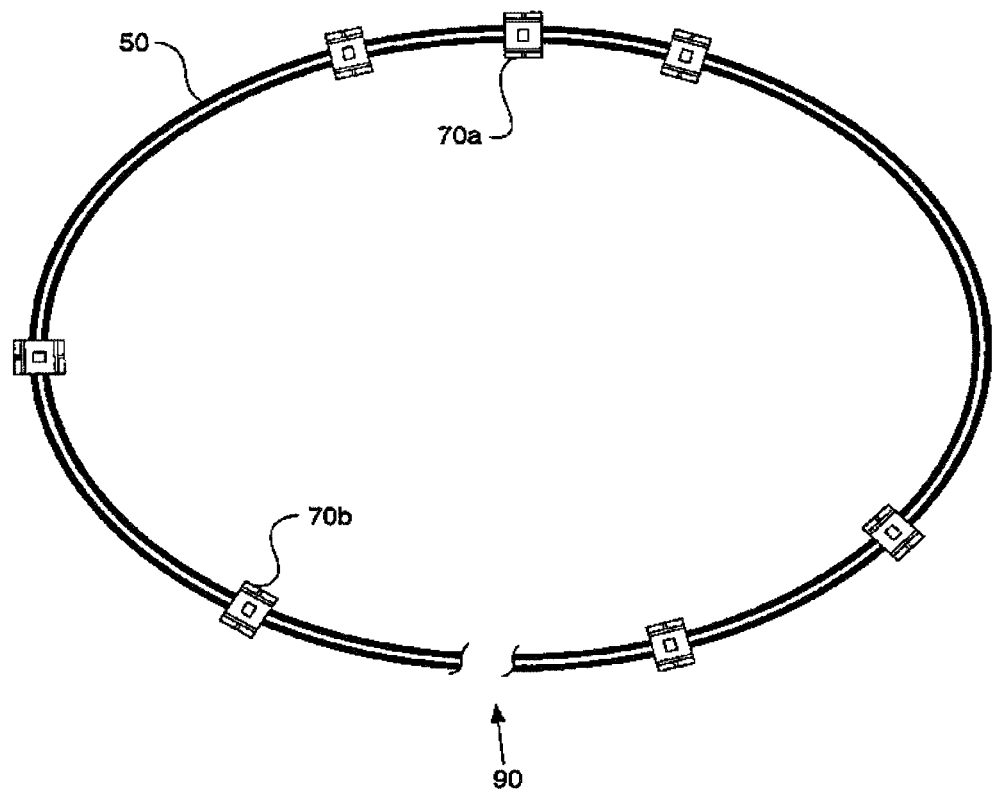
FIG. 8 shows diagrammatically a power and data delivery system 40 according to another embodiment of the present disclosure.

FIG. 8 shows diagrammatically a power and data delivery system 40 according to another embodiment of the present disclosure. Because the conductor 50 may be configured in a loop, a first smart connector 70*a* may transmit data on the conductor 50 to a second smart connector 70*b* that will travel in both directions from the first smart connector 70A. If a break 90 occurs in the conductor 50, the signal will only continue on the conductor until it reaches the break 90, at which time the signal will become fully attenuated. However, because of the loop configuration, the signal will still be capable of reaching the second smart connector 70*b* should a break 90 occur. Furthermore, a diagnostic mode may be built into the power and data delivery system 40 to assist in determining when and where a break 90 may have occurred in the conductor 50. For example, each smart connector 70 along the conductor 50 may be prompted to acknowledge receipt of a test signal. Failure to acknowledge by any smart connector 70 may indicate a smart connector malfunction or a break in the conductor 50. Further such diagnostic inquiries may yield more specific information.

Figure 9:
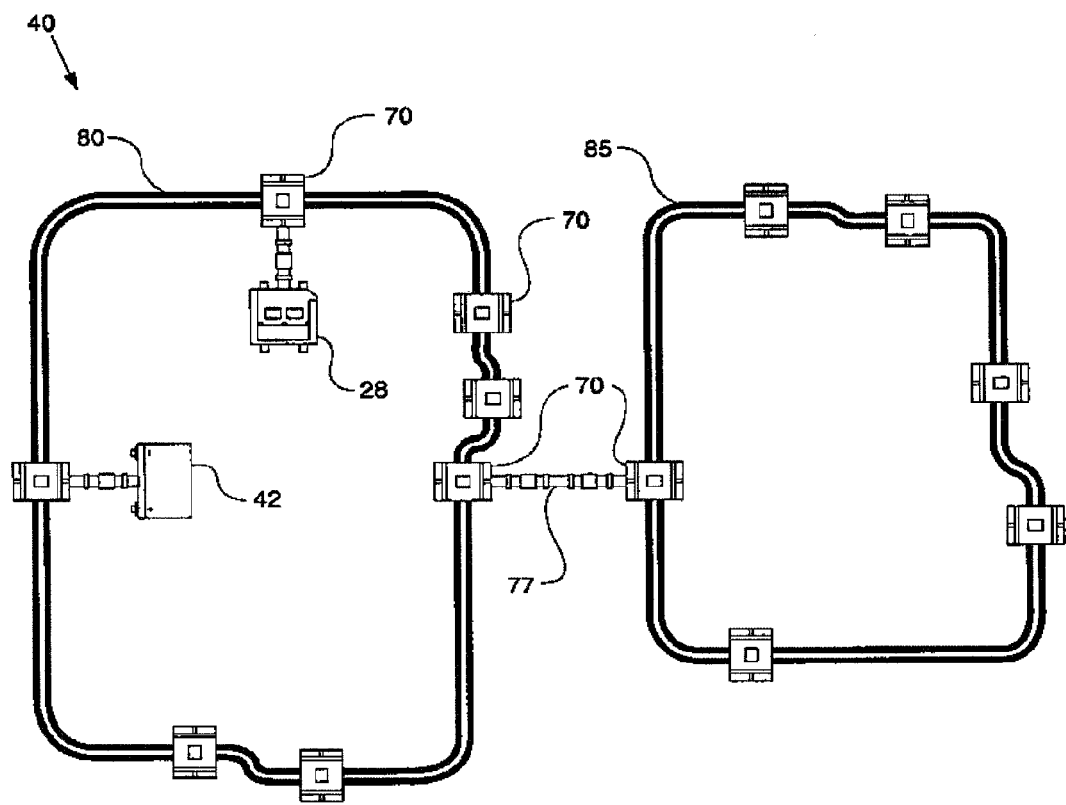
FIG. 9 shows diagrammatically a power and data delivery system according to another embodiment of the present disclosure.

FIG. 9 shows diagrammatically a power and data delivery system 40 according to another embodiment of the present disclosure. Although the conductor 50 as discussed and as shown in FIG. 1 is shown in a loop configuration, it may be arranged in other acceptable configurations known in the art such as spider or straight-line configurations. Alternatively, the configuration may be similar to that shown in FIG. 8. FIG. 8 shows a two-loop configuration wherein a first conductor 80 and a second conductor 85 are in communication with one another via smart connectors 70 on each loop connected by a device connector 77. In this embodiment, power and data may be transferred from the first conductor 80 to the second conductor 85 and thereby to the devices 60 on the second conductor 85. Alternatively, the second conductor 85 may also have a second power supply (not shown) to provide power to devices 60 on the second conductor 85. In this embodiment, the connection between the first and second conductors 80, 85 may be wired as described above or may be wireless using technologies such as, but not limited to, satellite or GPS, radio frequency (RF), cellular, and the like.

Figure 11:
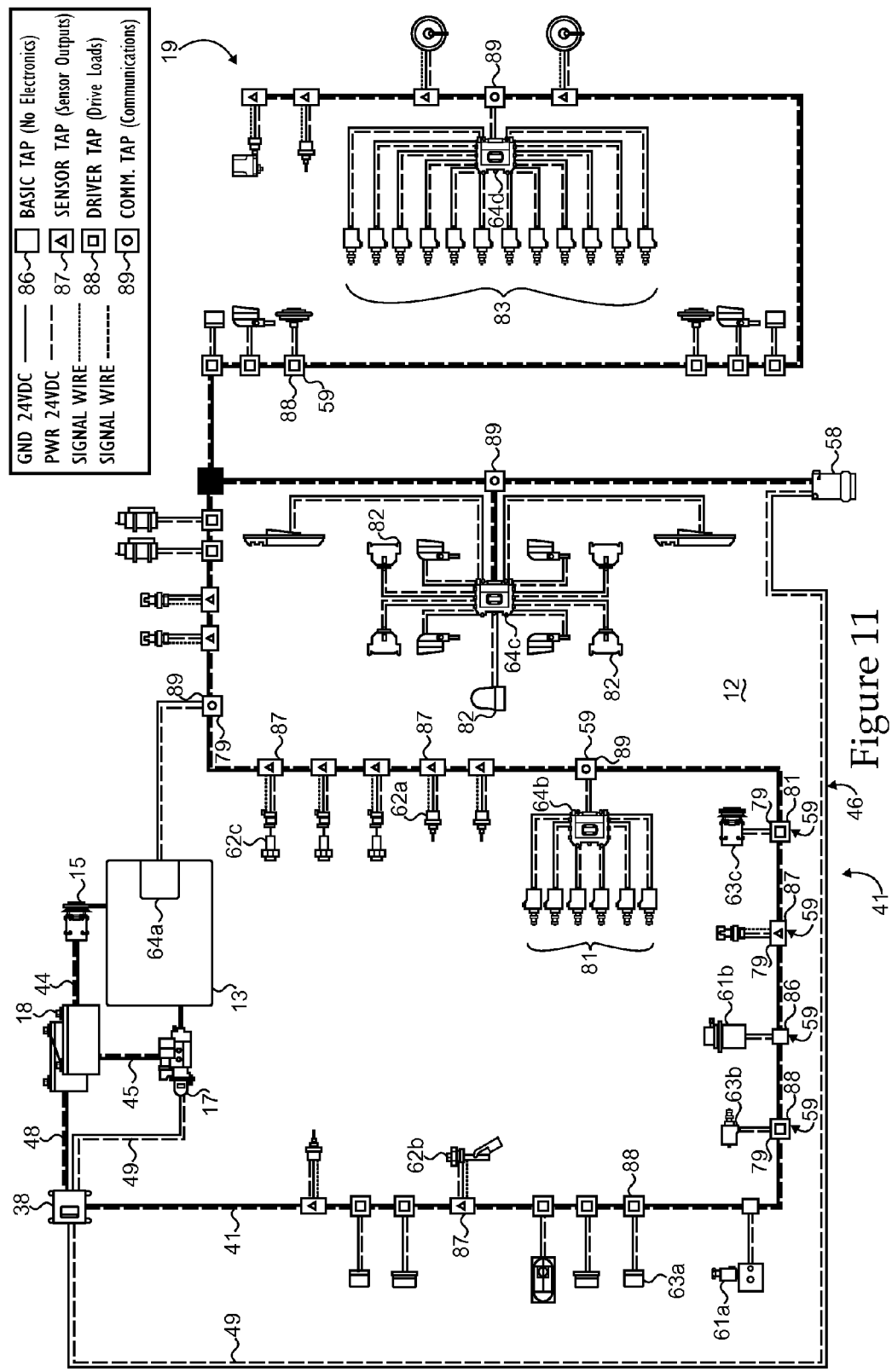
FIG. 11 is an electrical system for the chassis of schematic of the machine of FIG. 1.
Figure 12:
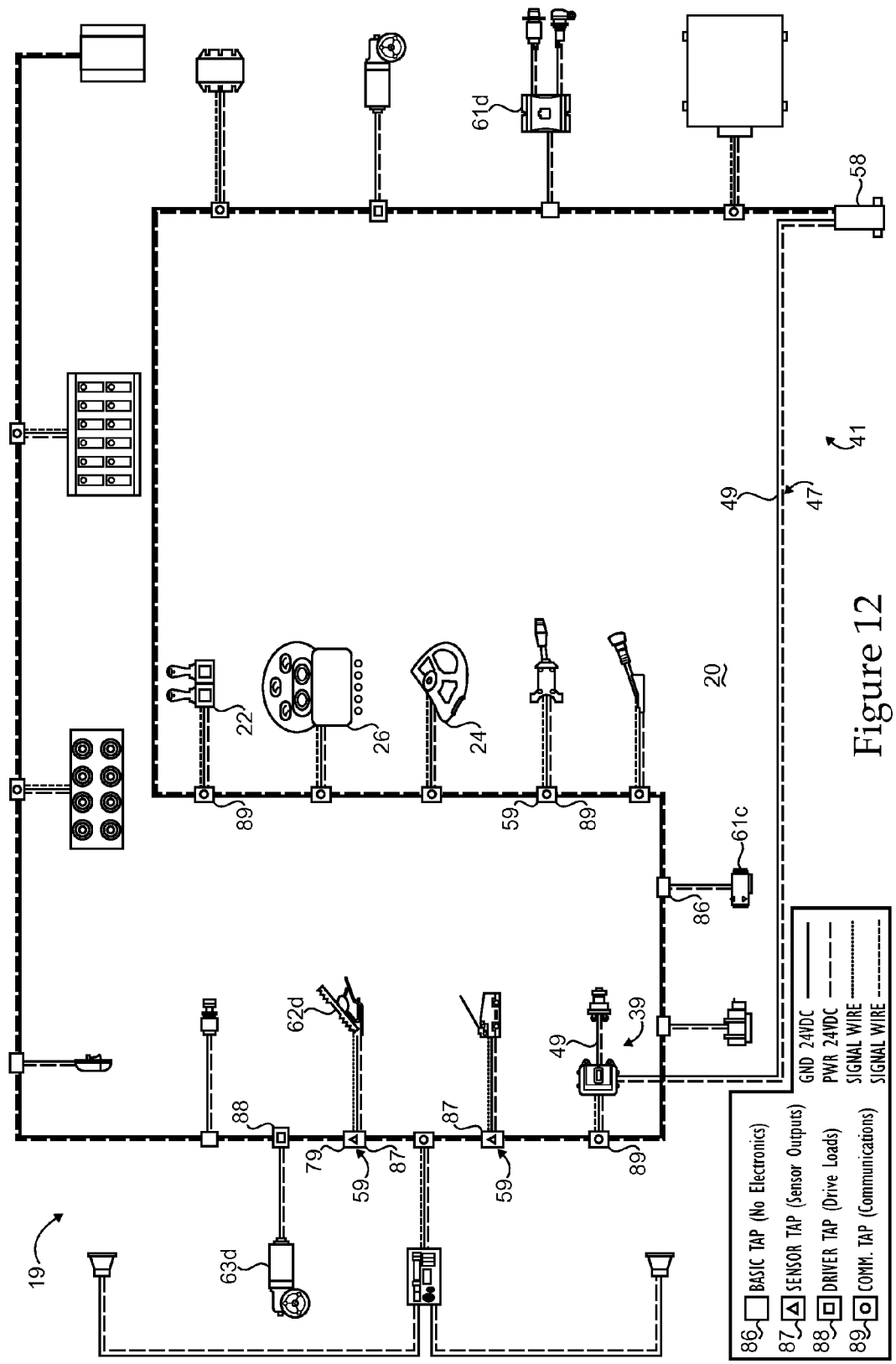
FIG. 12 is an electrical system schematic for the cab portion of the machine of FIG. 1.

Referring now to FIGS. 11 and 12, the electrical schematic 19 for the machine 10 of FIG. 1 is shown divided between a chassis portion on FIG. 11 and a cab portion in FIG. 12. The electrical system is built around a two wire power and data bus 41 that includes a chassis segment 46 as shown in FIG. 11 and a cab segment 47 illustrated in FIG. 12. As stated earlier, machine 10 includes an electronically controlled engine 13 that is controlled in a conventional manner via an engine electronic control module 64*a*. Engine 13 may be operably coupled to an alternator 15 in a conventional manner. The alternator may be connected to a battery 18 by a charging circuit 44 that is not part of the two wire power and data bus 41. The two wire power and data bus 41 may be electrically connected to battery 18 by a regulator circuit 48, that is also not part of the two wire power and data bus 41. Finally, a starter 17 may be operably coupled to engine 13 and electrically connected to battery 18 by a starter circuit 45, which includes a switching circuit 49. In this example embodiment, portions of the regulator circuit 48, the switching circuit 49 and the two wire power and data bus 41 are included as part of a main power module 38 that serves several purposes, including controlling key switch 39 power to the machine 10. In addition, the power module 38 may supply regulated power to the two wire power and data bus 41 via regulator circuit 48. The main power module also serves to engage the starter motor of starter 17. Finally, the main power module 38 may separate the starting and charging systems and their respective circuits from the two wire power and data bus 41. Recalling, the starter circuit 45 includes a switching circuit 49, and a cab segment of switching circuit 49 is electrically connected to a chassis segment of the switching circuit 49 by a cab interface connector 58 that also serves to electrically connect the chassis segment 46 of the two wire power and data bus 41 to the cab segment 47 of the two wire power and data bus 41.

Figure 13:
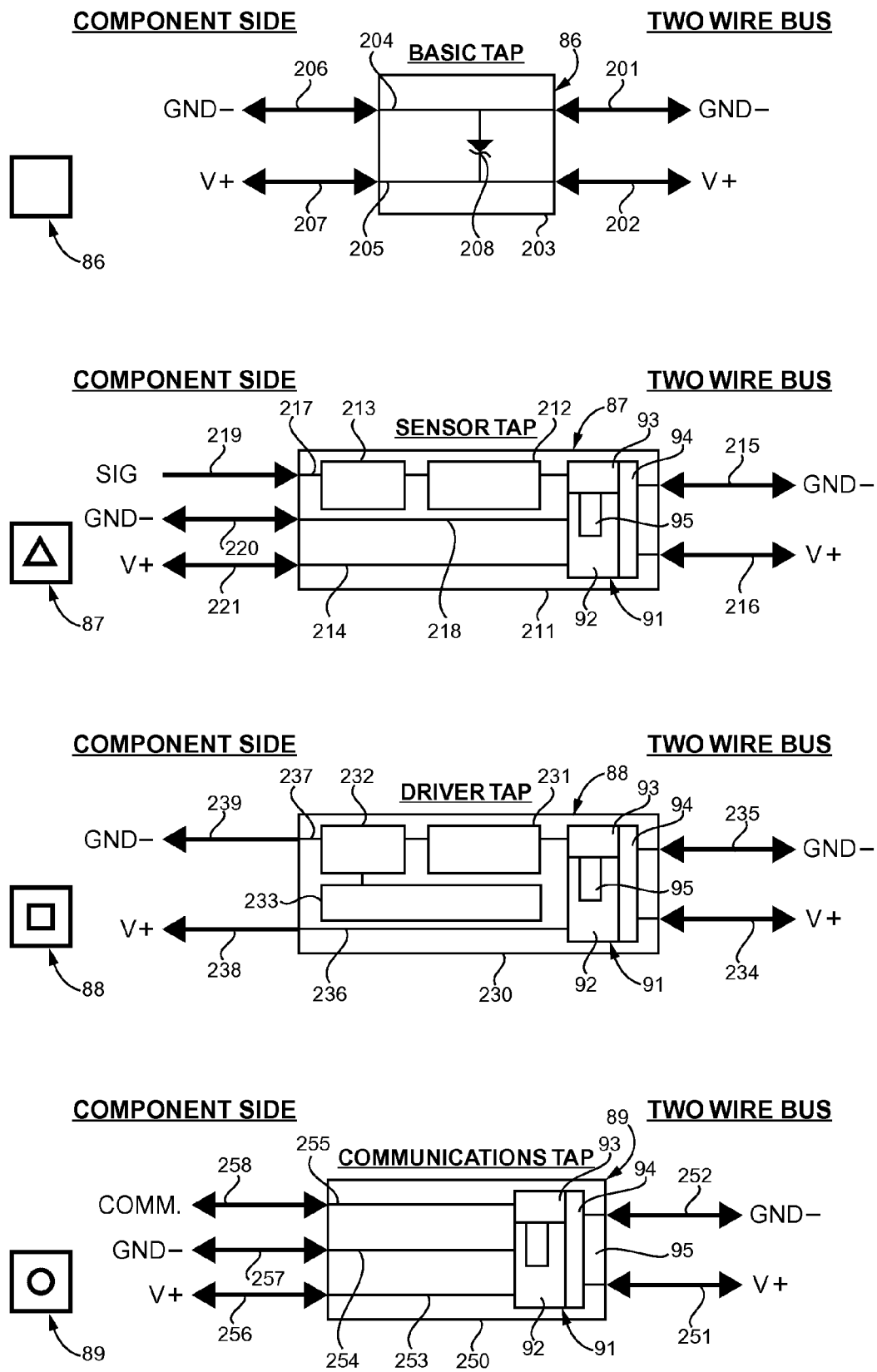
FIG. 13 are schematic views of basic, sensor, driver and communications connectors for use in the electrical system of FIGS. 11 and 12.

Machine 10 includes a plurality of electrical devices 61-64 are electrically connected to the two wire power and data bus 41. Among the plurality of electrical devices are at least one each of a basic electrical device 61, a sensor electrical device 62, a driven electrical device 63 and a communication electrical device 64. All of the electrical devices 61-64 of machine 10 are divided among these four categories in order to exploit a further innovation of the present disclosure. That innovation being the use of different types of connectors 59 depending upon the nature of the electrical device 61-64. While the system could be clearly constructed using a one-type-fits-all smart connector, substantial cost savings can be gained by having four types (86-89 discussed infra) of connectors 59 that are suitable with electrical devices in respective categories of the basic electrical devices 61, the sensor electrical devices 62, the driven electrical devices 63 and the communication electrical devices 64. Examples of basic electrical devices 61 may include a hood actuator 61*a*, a fuel priming pump 61*b*, a seat heater 61*c* or maybe an accessory voltage converter 61*d*. In each case, basic electrical devices will often include a separate switch. Basic electrical devices 61 may be connected to the two wire power and data bus 41 via a basic connector 86 as illustrated in FIG. 13. Basic electrical devices 61 require no processing and need only machine level voltage to function, and as stated earlier, usually contain their own on/off switch. Sensor electrical devices 62 may be characterized by their function to communicate information on machine status and function, and are often associated with sensing pressures, flows, temperatures, positions, and switch status, among other functions. In the schematics of FIGS. 11 and 12, examples of sensor electrical devices 62 are identified, including a torque converter oil temperature sensor 62*a*, a fuel level sensor 62*b*, a transmission speed sensor 62*c* and a throttle pedal sensor 62*d*. Nevertheless, those skilled in the art will appreciate that sensor devices may sense oil pressure, hydraulic pressure, oil temperature, coolant temperatures, coolant flows, oil bypass switching, brake pedal switching, and linkage or valve spool positions, among others. Examples of driven electrical devices 63 that are specifically identified as examples include a turn signal light 63*a*, a fan solenoid 63*b*, an AC compressor clutch 63*c* and a wind shield wiper motor 63*d*. Nevertheless, those skilled in the art will appreciate that driven electrical devices 63 may be characterized by a need to proportionally control amperage, or voltage or a duration of either, and may also be associated with devices that need metered power. Among these, driven electrical devices may also include fuel injectors, transmission or implement solenoids, bypass and coolant valves, parking brake actuators, turn signals, exterior and interior lighting, among others. Communication electrical devices 64 according to the present disclosure may be characterized by the ability to run software and manage machine strategies, such as implement control and engine management. Communication electrical devices 64 may also be part of the human interface like joy sticks and displays. Thus, the FIGS. 11 and 12 illustrate several communication electrical devices 64, according to the present disclosure including an engine electronic control module 64a, a transmission electronic control module 64b, a lighting electronic control module 64c, an implement electronic control module 64d, a message center 26, implement joystick controls 22 and a steering wheel 24.

As in a conventionally wired machine, each of the electronic control modules (e.g. 64a-64d) has a plurality of electrical devices connected to it. For instance, a plurality of clutch actuators 81 may be electrically connected to the transmission electronic control module 64b, a plurality of lights 82 may be electrically connected to lighting electronic control module 64c, a plurality of electro-hydraulic actuators 83 may be electrically connected to the implement electronic control module 64d, and a plurality of fuel injectors (not shown) may be electrically connected to the engine electronic control module 64a.

Although the present disclosure contemplates a "one size fits all" connector suitable for use across the spectrum from electrical base devices 61, through sensor and driven electrical devices 62 and 63, all the way to communication electrical devices 64, considerable savings may be obtained by utilizing specialized connectors suitable for each of the different types of electrical devices. In particular and referring in addition to FIG. 13, a basic electrical device 61 may be electrically connected to the two wire power and data bus 41 by a basic electrical connector 86. Sensor electrical devices 62 may be electrically connected to the two wire power and data bus 41 by a sensor electrical connector 87. Driven electrical devices 63 may be electrically connected to the two wire power and data bus 41 by a driver electrical connector 88. Finally, communication electrical devices 64 may be electrically connected to the two wire power and data bus 41 by a communication electrical connector 89.

Basic electrical connectors 86 may include a housing 203 within which an internal ground wire 204 is separated from an internal voltage wire 205 by a surge suppression diode 208. Basic electrical connector may be electrically connected to the two wire power and data bus 41 via a bus ground connector 201 and a bus voltage connector 202. On the other side, the basic electrical connector 86 may be electrically connected to a basic electrical device 61 via a component ground connector 206 and a component voltage connector 207. The surge suppression diode 208 may facilitate suppression of fly back power anomalies that could cause interference with communications on the two wire power and data bus 41. Such events might occur especially when the basic electrical device 61 is being powered on/or off.

Apart from the basic electrical connectors 86 are smart connectors 79 that include the sensor smart connector 87, the driven smart connector 88 and the communication smart connector 89. The sensor smart connector 87 may include a housing 211 within which is housed a power line communication chip 91, a microprocessor 212, an input filter 213, as well as an internal voltage wire 214, an internal ground wire 218 and an internal signal wire 217. The sensor electrical connector 87 may be electrically connected to a two wire power and data bus 41 via a bus ground connector 215 and a bus voltage connector 216. On the other side, the sensor electrical connector 87 may be electrically connected to a sensor electrical device 62 via a component signal connector 219, a component ground connector 220 and a component voltage connector 221. Input filter 213 may be similar to what can be found in currently available electronic control modules for machines of the type associated with the present disclosure. For instance, analog and pulse width modulated signals in raw form may have a dynamic range that needs to be clipped before being processed by the microprocessor 212.

The microprocessor 212 may take the analogous information from an attached sensor and construct it for messaging and control. For instance, the microprocessor 212 may construct the information from the sensor as a digital message in some appropriate protocol, such as J1939, CAN, Flexray or any other suitable messaging protocol. After being constructed, the sensor information may be transmitted to the power line communication chip 91 via a serial peripheral interface bus communication. The sensor information may then be transmitted on the two wire power and data bus 41 with a suitable address for the intended recipient of the information.

A driver electrical connector 88 may include a housing 230 within which a power line communication chip 91, a microprocessor 231, an output driver 232 and a heat sink 233 may be disposed. Also within housing 230 may be an internal voltage wire 236 and an internal ground wire 237. The driver electrical connector may be electrically connected to the two wire power and data bus 41 via a bus ground connector 235 and a bus voltage connector 234. On the other side, the driver electrical connector 88 may be electrically connected to a driven electrical device 63 by a component ground connector 239 and a component voltage connector 238. The output driver 232 may be similar to what is currently a portion of counterpart electronic control modules for current machines that will activate components such as solenoids and the like. The heat sink 233 may be used in those instances where the drivers are proportional and as such will need to dissipate heat that needs to be expended. The microprocessor 231 receives driver information from the power line communication chip 91, which may be in the form of a digital message in a suitable protocol. Microprocessor 231 instructs an appropriate signal for the output driver to drive the driven electrical device 63 in a conventional manner.

Each communication electrical connector 89 includes a housing 250 within which is disposed a power line communication chip 91, an internal voltage wire 253, an internal ground wire 254 and an internal communication wire(s) 255. The communication electrical device may be electrically connected to a two wire power and data bus 41 by a bus ground connector 252 and a bus voltage connector 251. On the other side the communications electrical connector 89 may be electrically connected to a communication electrical device 64 by a component communication connector 258, a component ground connector 257 and a component voltage connector 256. Thus in the case of communications electrical connectors, the processing of messages to and from the power line communication chip are done on resident processors associated with the particular communication electrical device 64. However, the power line communication chip 91 facilitates the transmission and receipt of communications from other ones of the electrical devices 62-64 over the two wire power and data bus 41.

Each of the smart connectors 79 (sensor electrical connectors 87, driver electrical connectors 88 and communication electrical connectors 89) includes a power line communication chip 91. Although those skilled in the art will recognize that the power line communication chip 91 for the direct current two wire power and data bus of the present disclosure could be designed from scratch and would be within the scope of this disclosure, the present disclosure also reveals that commercially available alternating current power line communication chips may be modified for use in direct current machines 10 according to the present disclosure. In particular, each of the power communication chips 91 of the present disclosure may include an alternating current power line application specific integrated circuit 92 with a processor 95 that is configured to communicate with an outside microprocessor (e.g., 212, 231, other ECM) via serial peripheral interface bus communication as known in the art. The alternating current power line application specific integrated circuit (AC ASIC) may include a memory 93 that is configured to store a unique identifying address, which address would be associated with the attached electrical device 62-64. In order to facilitate connection of the AC ASIC to a DC two wire power and data bus 41, the power line communication chip 91 may include an inductive toroid 94 that is configured to enable the AC ASIC to communicate on a predetermined set of frequencies on the direct current two wire power and data bus 41. Thus, the inductive toroid 94 adapts the AC ASIC for functioning on a DC bus. One specific AC ASIC particularly suitable for the present disclosure may be among the Intellon series of AC power line application specific integrated circuits that are commercially available for facilitating internet communications over domestic AC power lines. It was found that by utilizing three unused clock inputs on the AC ASIC, it could be made to communicate via serial peripheral interface bus communication with another microprocessor of machine 10 utilizing current digital communication strategies. Thus, each power line communication chip 91 on machine 10 will be associated with a unique address and be configured to receive all power line carrier messages on the two wire power and data bus 41, but only act on or change a power line carrier message with its unique address. The term change or act on is intended to mean that the electrical device 62-64 associated with the unique address will send or receive information, be driven or accept sensor information if the carrier message includes that same unique address.

According to an additional aspect of the present disclosure, each smart connector, shown generally at 70 and 79, may store and execute a device testing algorithm for evaluating a plurality of characteristics of a respective device connector 77. The device connectors 77, as described above, are configured to transfer power and, in some instances, data from the two wire power and data bus 41 to electrical devices 61-64, and, as such, define at least one of a power link and a communication link. Specifically, the device connectors 77 may define at least one of a power link and a communication link between each of the smart connectors 70 and 79 and the respective electrical devices 61-64. Therefore, the device testing algorithm may evaluate characteristics of one or both of the power link and the communication link. As stated above, the power and data delivery system 40 may have a two-wire configuration, including two conductors, or may have a one-wire configuration, including a single conductor. According to either embodiment, the transfer of power and data preferably occurs over the same conductor, such as conductor 51.

As described above, the smart connectors 70 and 79 may have specific configurations based on the type of electrical device 61-64 being connected to the two wire power and data bus 41 or, more specifically, the conductor 51. For example, basic electrical devices 61 may be connected to the two wire power and data bus 41 using basic electrical connectors 86 configured to transfer power to the basic devices 61. Sensor electrical devices 62 may be connected to the two wire power and data bus 41 using sensor electrical connectors 87, which may transfer power to the sensor devices 62 and receive data signals from the sensor devices 62. Driven electrical devices 63 may be connected to the two wire power and data bus 41 using driven electrical connectors 88, which transfer power to the driven devices 63. The communication electrical devices 64 may be connected to the two wire power and data bus 41 using communication electrical connectors 89. The communication electrical connectors 89 may transfer power to the communication electrical devices 64 and may also send and receive data along the device connectors 77. The device testing algorithms may be implemented on each of the smart connectors 86-89; however, the algorithms may differ based on the specific type of electrical devices 61-64 attached to the respective connectors 86-89.

According to the exemplary embodiment, the processor 95 of each of the smart connectors 86-89 may be configured to execute a device testing algorithm stored in the respective memory 93 of the connector 86-89. According to some embodiments, the device testing algorithms of the smart connectors 86-89 may execute simultaneously. The device testing algorithms, which will be specifically discussed with reference to FIGS. 14-16, may assess the operating condition, or health state, of the respective electrical devices 61-64 by evaluating characteristics of the power link and/or the communication link defined by the device connectors 77.

Figure 14:
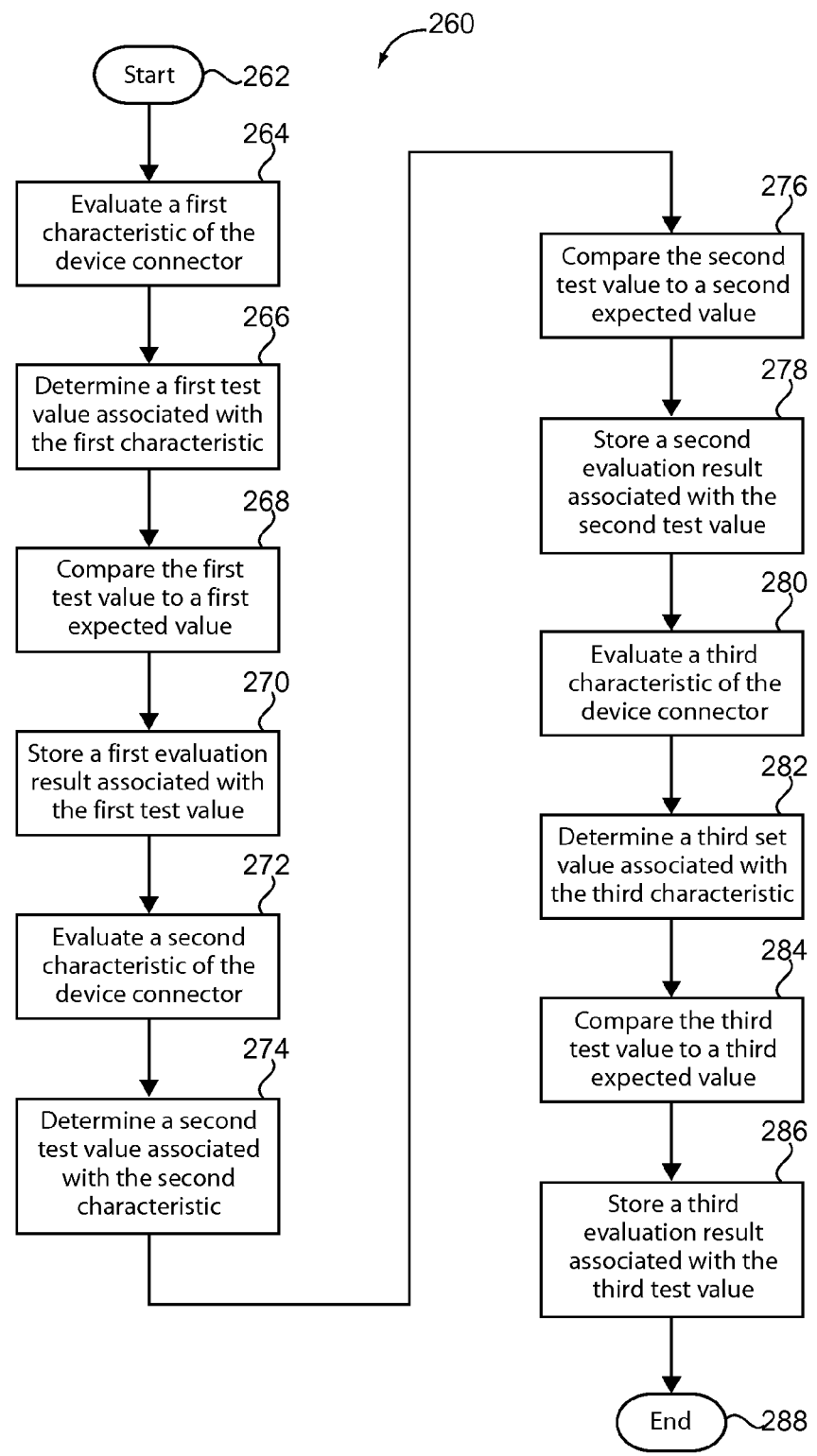
FIG. 14 is a logic flow chart of one embodiment of a device testing algorithm, as may be implemented by smart connectors of FIG. 13, according to another aspect of the present disclosure.

Turning now to FIG. 14, there is shown a logic flow diagram 260 representing an exemplary device testing algorithm, according to the present disclosure. As stated above, the device testing algorithm, described and referenced below as a method, may be implemented by the processors 95 of the electrical connectors 86-89. According to one example, the steps implementing the disclosed method may be in the form of computer readable program code stored in the memories 93 of the electrical connectors 86-89 and executed by the processors 95. The algorithms may run continuously, at predetermined intervals, or may be initiated in response to one or more predetermined events, as described below.

The method begins at a START, Box 262. From Box 262, the method proceeds to Box 264, which includes the step of evaluating a first characteristic, of a plurality of characteristics, of the device connector 77. The plurality of characteristics of the device connector 77 may include, but are not limited to, one or more of a current, a voltage, a resistance, and a data link message. Such characteristics may be used to make a determination regarding the operating condition of the device connector 77 and/or the respective electrical device 61-64. For example, the processor 95 may use one or more known devices to sense, monitor, or otherwise determine a first test value associated with the first characteristic, at Box 266. Further, the processor 95 may use an equation, such as an equation stored in memory 93, to arrive at the first test value based on the sensed or monitored value. According to a specific example, an appropriate meter or sensor may be used to measure resistance, just as sensors or meters may be used to determine the current or voltage. Alternatively, however, an Ohm's law equation stored in memory 93, along with the measured current and voltage, may be used to arrive at the resistance test value.

The first test value is then compared to a first expected value, which may be stored in the memory 93, at Box 268. The first expected value may represent a range of acceptable values or, alternatively, may represent a single threshold value. Further, the memory 93 may store one or more first expected values that are specific to the electrical devices 61-64. Thus, some memories 93 may store different expected values than other of the memories 93. For example, if resistance is being evaluated, the device testing algorithm may compare the resistance value that was determined at Box 266 with an expected resistance value stored in memory 93 that is unique to the specific electrical device 61-64 that is connected through the device connector 77. It should be appreciated that, if the determined resistance value is below the expected resistance value for the electrical device 61-64, a short may be indicated.

As should be appreciated, the comparison at Box 268 may include a determination of whether the test value is below the expected value, above the expected value, or falls within or outside of an expected range. According to another example, the device testing algorithm may measure or otherwise determine the current, and compare it to an expected value or range for the respective electrical device 61-64. If the current spikes above the expected value or range, a short may be indicated. According to yet another example, data link messages sent back from the devices 61-64 may be evaluated and compared to expected messages. Specifically, data link messages may be compared to expected message formats and, if the received messages are not in an expected format, it may be determined that the device 61-64 is faulty. Such messages may be sent and received in the normal course of operation or may be sent as test messages to evaluate the operation of the respective device connector 77 and/or electrical device 61-64.

As stated above, the device testing algorithms may be used to evaluate the operating condition of the device connectors 77 and electrical devices 61-64 by evaluating characteristics of one or both of the power link and the communication link defined by the device connectors 77. Although specific examples of characteristics are identified above, it should be appreciated that numerous additional characteristics may be monitored and evaluated to make determinations regarding the operational health of the power and/or communication link between the smart connectors 86-89 and the respective electrical devices 61-64. By evaluating the characteristics, or parameters, conclusions may be made regarding the basic operational health of specific segments, or circuits, of the power and data delivery system 40. For example, it may be determined that a specific circuit includes an open circuit, an unwanted parasitic load or short-to ground, a high resistance problem, feedback from another circuit, or another similar problem.

At Box 270, a first evaluation result associated with the first test value may be stored in the memory 93. For example, it may be desirable to store the actual test value in memory 93, or it may be desirable to store only an indication of whether or not the test value was within the expected range, or below or above the expected value. Thus, the evaluation result, which may also be referred to as a diagnostic result, might indicate a potential failure, such as one of the conditions listed above, or might otherwise indicate an evaluation of the operating condition of the device connector 77 and/or connected electrical device 61-64. As will become more apparent below, it may be desirable to store the actual test values in memory 93 so that the historical data may be evaluated to identify possible trends.

At Box 272, a second characteristic of the device connector 77 is evaluated. The second characteristic, which may also be one or more of the characteristics identified above, may be used, at Box 274, to determine a second test value. The second test value, which may be determined using a sensor, meter, or other similar characteristic detecting device, along with one or more equations stored in memory 93, may be compared to a second expected value or range, at Box 276. A second evaluation result, which may include the second test value or an indication of whether or not the second test value fell within the expected range, is then stored in memory 93, at Box 278. As should be appreciated, similar actions for performing the evaluating, determining, comparing, and storing steps, as described above with respect to the first characteristic, may be taken with regard to the second characteristic.

A third characteristic, which may include any one or more of the plurality of characteristics identified above and/or any similar characteristics, may also be evaluated, at Box 280. A third test value associated with the third characteristic will be determined, at Box 282, and compared to a third expected value, at Box 284. A third evaluation result associated with the third test value is then stored in memory 93, at Box 286. Although the method was described as sequentially evaluating three characteristics of the device connector 77, it should be appreciated that the method may evaluate any desired number of characteristics. The characteristics may be selected based on a potential to identify current and/or potential operating issues with respect to the portion of the power and data delivery system 40 between, and including, the smart connectors 86-89 and the respective electrical devices 61-64.

Figures 15, 16:
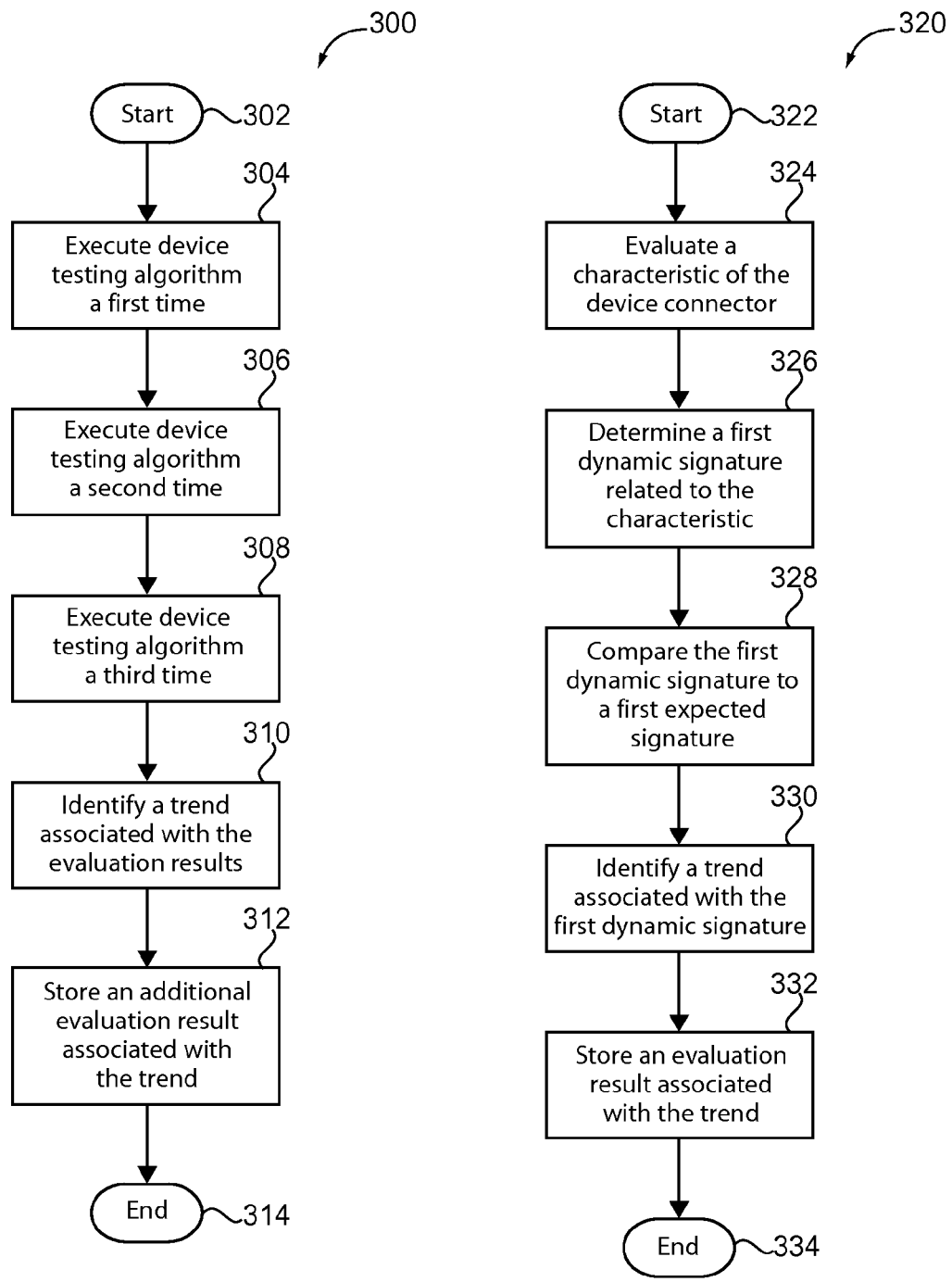
FIG. 15 is a logic flow chart of another embodiment of a device testing algorithm, as may be implemented by smart connectors of FIG. 13, according to another aspect of the present disclosure.
FIG. 16 is a logic flow chart of yet another embodiment of a device testing algorithm, as may be implemented by smart connectors of FIG. 13, according to another aspect of the present disclosure.

As shown in FIG. 15, the device testing algorithm disclosed herein may include the following method shown in a logic flow diagram 300. As should be appreciated, the method represented by flow diagram 300 may represent a modification or enhancement to the device testing algorithm of FIG. 14. The method begins at a START, Box 302. From Box 302, the method proceeds to Box 304, which includes a step of executing the device testing algorithm or, more specifically, the method exemplified in FIG. 14 a first time. As described above, the method of FIG. 14 includes the sequential evaluation of each of a plurality of characteristics of the device connector 77. Each evaluation further includes determining a test value associated with the characteristic, comparing the test value with an expected value or range, and storing an evaluation result associated with the test value. Therefore, as a result of the execution of the device testing algorithm of FIG. 14, a plurality of evaluation results may be stored in memory 93.

At Box 306, the device testing algorithm of FIG. 14 is executed a second time, resulting in more evaluation results being stored in memory 93, and, at Box 308, the device testing algorithm is executed a third time, resulting in even more evaluation results. At Box 310, a trend associated with the evaluation results is identified. Specifically, for example, the processor 95 may evaluate the evaluation results, such as by comparing the evaluation results associated with each characteristic to one another. A trend may represent an increasing or decreasing value, which may increase or decrease by a predetermined amount over a predetermined period of time, or may represent any other observable pattern of the evaluation results. At Box 312, an additional evaluation result, which may represent a diagnostic or prognostic result, associated with the trend may be stored in memory 93. After the additional evaluation result, which may, for example, include any desired representation of a trend or an indication of whether or not a trend was identified, is stored, the method proceeds to an END, at Box 314. It should be appreciated that a trend may represent an indication that a condition, such as one of the conditions identified above or any similar condition, may occur in the future. Specifically, such a prognostic algorithm may take time-dependent data history, extract a trend, and estimate the value at some future time.

Alternatively, or additionally, an evaluation result may be obtained by evaluating dynamic signatures. Turning now to FIG. 16, the device testing algorithm disclosed herein may include the following method shown in a logic flow diagram 320. As should be appreciated, the method represented by flow diagram 300 may represent a modification or enhancement, or even alternative, to one or both of FIGS. 14 and 15. However, it should be appreciated that the method of FIG. 15 may be more appropriate for some of the electrical devices 61-64, while the method of FIG. 16 may be more appropriate for other of the electrical devices 61-64.

The method begins at a START, Box 322. From Box 322, the method proceeds to Box 324, which includes a step of evaluating a characteristic of the device connector 77. More specifically, a first dynamic signature related to the characteristic, such as one of the plurality of characteristics identified above, is determined, at Box 326. The first dynamic signature may be any signal, such as a signal generated by one or more of the characteristics, having a varying amplitude. Next, at Box 328, the first dynamic signature is compared to a first expected signature. As should be appreciated, a set of dynamic signatures may be determined and compared to a range of expected signatures. A trend may then be identified, at Box 330, associated with the first dynamic signature, or set of dynamic signatures, and an evaluation result associated with the trend may be stored in memory 93, at Box 332. After the evaluation result is stored in memory 93, the method proceeds to an END, at Box 334.

The diagnostic and/or prognostic logic described above may be carried out using the smart connectors 86-89 to evaluate the operating condition, or health state, of the electrical devices 61-64 by evaluating characteristics of the portion of the power and data delivery system 40 between, and including, the smart connectors 86-89 and the respective electrical devices 61-64. Specifically, the algorithms described herein extract features from real-time data, and/or historical data, and take into account varying operational ranges or profiles that constitute a healthy operational state to make determinations regarding the health state of the respective portions of the power and data delivery system 40. For ease of installation and replacement of the smart connectors 86-89, it may be desirable to execute identical device testing algorithms on each of the connectors 86-89. However, it should be appreciated that alternative and/or additional algorithms may be provided for some of the connectors 86-89, such as based on the particular electrical device 61-64 that is attached. Further, it may be desirable to evaluate characteristics according to a specific order and, according to some embodiments, discontinue performance of the device testing algorithm if and/or when a failure or potential failure is identified.

The evaluation results, which may represent diagnostic and/or prognostic results, that are obtained using one or more of the methods described with reference to FIGS. 14-16 may be relayed to a master controller on the machine 10 and/or may be relayed to a location that is remote from the machine 10. It should be appreciated that such device testing algorithms may run continuously and, because of the integration with the power and data delivery system 40 disclosed herein, are capable of simultaneously monitoring the health of each and every electrical device 61-64 that is connected to the power and data delivery system 40 via the smart connectors 86-89. As such, the algorithms may facilitate more accurate diagnosing of failures and/or potential failures than previous designs. More specifically, where failures in complex electronic systems can be extremely difficult to isolate and identify, the disclosed device testing algorithms executing on each smart connector 86-89 are capable of evaluating the operating condition of each device connector 77 and electrical device 61-64 to more accurately isolate and identify failures and/or potential failures. This may provide more accurate diagnosing and, as a result, may reduce times where fully functional units or devices are replaced and potentially faulty units or devices are returned to the fields.

INDUSTRIAL APPLICABILITY

The power and data delivery system 40 comprises a power supply 42, a conductor 50, smart connectors 70, and devices 60. After the system 40 is arranged on a machine 10, smart connectors 70, generally configured within housings 71, may be attached to the conductor 50 in locations near where devices 60 may desirably be located. The devices 60 may be attached to the smart connectors 70 through device connectors 77 that may allow for the transfer of power and data from the conductor 50 to the devices 60 through the smart connectors 70.

The present disclosure provides an improved system and method for power and data delivery on a machine 10. This system and method negate the need for today's cumbersome wiring harnesses, and enable greatly reduced costs due to reductions in the number of components and standardization of many key parts. Routing of the conductor 50 may be made substantially easier because of its reduced size and weight, thereby simplifying such tasks as making connections to devices, troubleshooting the system and devices, and adding devices as desired. This system and method makes upgrading older machines much easier and cost efficient. EMI may also be minimized due to the nature of the system configuration, i.e. the ability of having drivers close to driven devices, and the ability to send communications over multiple frequencies. In other words, the ability to send communications over multiple frequencies may increase robustness even in the face of outside electromagnetic interference, and the short distance between drivers and driven devices may reduce the creation of electromagnetic interference by the system itself. The system 40 may also have the ability to perform additional functions. These functions may comprise power sharing, regeneration, high level diagnostics and prognostics, fuzzy logic based learning for performance optimization, site management, and other functions that, because of previous wiring configurations such as wiring harnesses, were too complex and burdensome to be done. Even at the prototyping stage, the two-wire power and data bus and specialized smart connectors of the present disclosure have shown themselves to be cost competitive with current wiring harness strategies. However, and maybe even more importantly, the trend for ever more complex machines into the future can result in substantial cost savings by choosing a wiring and communication strategy according to the present disclosure rather than relying upon ever more complex wiring harnesses as is the current trend. In addition, both robustness and reliability can be improved as there would be many fewer parts to make, assemble, wear, abrade, etc. and therefore many fewer opportunities for problems than those that might be associated with the more complex wiring harnesses in today's machines. Finally, and maybe not so obvious, the data link wiring typically associated with wiring harnesses and used today might be on the order of 18 gauge, and have an insulation covering proportional to that wiring diameter. On the other hand, a two wire power and data bus according to the present disclosure would be much thicker, maybe on the range of 6 gauge, and have a correspondingly much thicker insulation layer, which may even be further buttressed with an abrasion resistant shield. When the machines are in typical operation, portions of the wiring harness inherently move and rub against solid portions of the machine. One could expect the two wire power and data bus to be much more resistant to potential shorting and the like than has been observed in the case of current smaller wires associated with current wiring harnesses.

Figure 10:
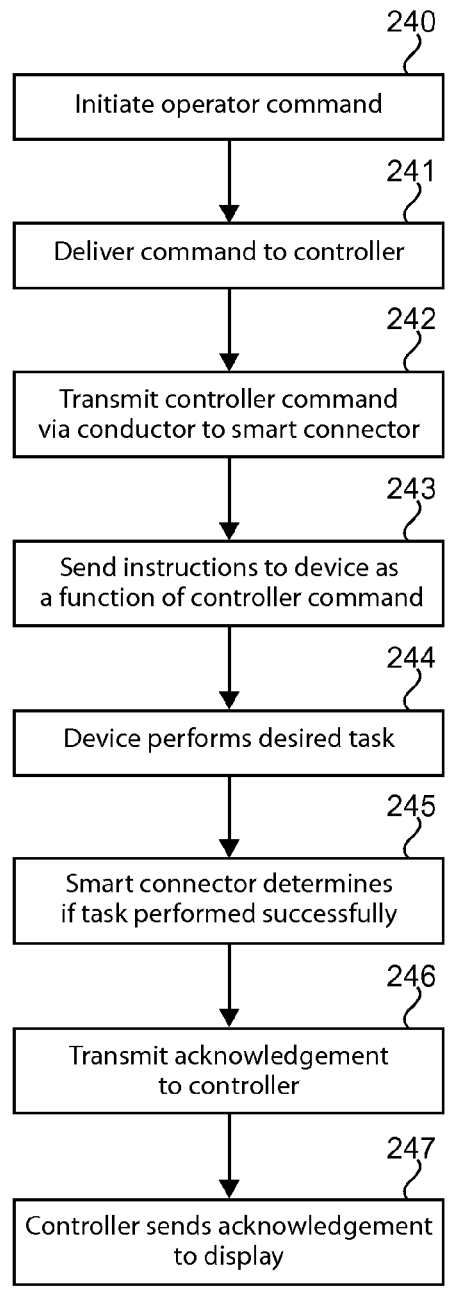
FIG. 10 is a flow diagram depicting steps of operation of a power and data delivery system according to one embodiment of the present disclosure.

Embodiments of the present disclosure are applicable to a number of machines 10 where both power and data may be routed to devices 60 connected to those machines 10. FIG. 10 is a flow diagram depicting steps of operation of a power and data delivery system 40 according to one embodiment of the present disclosure. Once an operator initiates a command in a first control block 240, the command may be sent to a controller, as depicted in a second control block 241. According to the controller protocol, the controller command may be transmitted via the conductor 50 to a smart connector 70 for a device 60, as shown in a third control block 242. The smart connector 70 may then process the controller command and send instructions to the device 60 as a function of the controller command, as shown in a fourth control block 243. The device 60 may then perform the desired task according to its instructions, as shown in a fifth control block 244. The smart connector 70 may then determine if the task was performed successfully, as shown in a sixth control block 245 and transmit an acknowledgement through the conductor 50 to the controller 28, as shown in a seventh control block 246. Upon receipt of acknowledgement, the controller 28 may then send the acknowledgement to a display 26 for the operator to view, as shown in an eighth control block 247.

As an example of a particularly complex application of the present disclosure, a machine 10, such as a wheel loader, may be used to perform a lift function in which lift and tilt cylinders are controlled in coordination with one another for a process known as level lift. For example, as the machine 10 is used to pick up and drop off loads with the implement 14, various communications may occur within the system 40 to effectuate that movement. As the lift control device 22 is moved by the operator, the smart connector for the lift control device 22 may transmit a command through the conductor 50 for the lift cylinder 32. The smart connector for the lift cylinder 32 may then receive the command and cause the lift cylinder 32 to actuate. The smart connector for the lift cylinder 32 may then transmit data through the conductor 50 for the requesting smart connector confirming that the lift cylinder 32 is actuating.

The smart connector for the lift control device 22 may also transmit a request through the conductor 50 to query a position sensor (not shown) for the lift cylinder 32. Based on the query, the position sensor may make a reading and transmit that reading through the conductor 50 for the requesting smart connector. The smart connector for the lift control device 22 may then know the amount of extension of the lift cylinder 32 in relation to the tilt cylinder 34 and begin to transmit a command for the tilt cylinder 34 to actuate.

The smart connector for the tilt cylinder 34 may then receive the command and cause the tilt cylinder 34 to actuate. The smart connector connected to the tilt cylinder 34 may then transmit data through the conductor 50 for the smart connector for the lift control device 22 confirming that the tilt cylinder 34 is actuating.

The smart connector for the lift control device 22 may then transmit a request through the conductor 50 to query a position sensor (not shown) for the tilt cylinder 34. Based on the query, the position sensor may make a reading and transmit the reading through the conductor 50 for the requesting smart connector. The smart connector for the lift control device 22 may then know the amount of extension of the tilt cylinder 34 in relation to the lift cylinder 32.

The aforementioned communications may then continue to happen causing the implement 14 to maintain a level lift. All of the above communications may be made nearly simultaneously and the data for the movements may be traveling over the same conductor 50 at the same time. Furthermore, communications for other systems or subsystem of the machine 10, such as an engine control system, will also be passing data across the conductor 50 simultaneously to the data communications for a level lift.

A power and data delivery system 40 may also find application with a first conductor 80 found on a truck, i.e., a tractor of a tractor-trailer, and a second conductor 85 found on a trailer capable of operable connection to the truck. This application is similar to the embodiment of the present disclosure as shown in FIG. 9. The first conductor 80 may be capable of carrying power and data to a number of devices 60 on the truck including, but not limited to, lights, brakes, the engine, sensors, displays, etc. The second conductor 85 may be capable of carrying power and data to a number of devices 60 on the trailer including, but not limited to, controller 28, lights, brakes, GPS, climate control, etc.

Upon connection between the first and second conductors 80, 85, the controller 28 may be capable of recognizing that the smart connector 70 on the first conductor 80 is connected to another smart connector 70 on the second conductor 85. This connection may cause power and data to be carried to the second conductor 85 and allow for activation of the devices 60 on the second conductor 85. Alternatively, and as mentioned above, the connection between the first conductor 80 and the second conductor 85 may be done wirelessly. This may be done using GPS or RF electronics and may be based upon proximity of the trailer to the truck. Having GPS may also allow for additional functionality of the machines 10. GPS may assist in machine security as well as conformance with regulations based on machine location.

GPS and/or RF technology may allow for the presence of conductors 50 on separate mobile machines 10, such as two wheel loaders, wherein each wheel loader may have proximity alarms or warnings notifying the operators of another nearby machine 10. Further, GPS and/or RF technology may assist in remote control and/or communication with an autonomously controlled machine. Having multiple conductors 50 may also simplify the arrangement of wiring on articulated machines where all wiring on a rear portion of the machine 10 must pass through the articulated joint. Separate conductors 50 may allow for a single device connector 77 between the conductor in the front portion and the rear portion of an articulated machine.

Referring back to FIGS. 1, 11 and 12, machine 10 differs from previous machines of its type by utilizing a two wire power and data bus 41 to facilitate power and communication transmissions. The machine 10 differs from power line communication systems associated with, for instance, transmitting and receiving internet messages over a domestic AC electrical system by the fact that the machine 10 has an on-state when engine 13 is running, and an off-state when engine 13 is not running However, machine 10 may also have a hybrid state in which communications are occurring across the two wire power and data bus 41, but the engine 13 is not running For instance, uploading information from the machine 10 to a remote location, or receiving, for instance, some software updates from a remote location while the machine 10 is an off state is also contemplated by the present disclosure. When machine 10 is in an off state, there may be no power or only trickle power on the two wire power and data bus 41 as facilitated by the main power module 38. When it comes time to change the machine 10 from an off state to an on state, the battery 18 is fully electrically connected to the two wire power and data bus 41 by changing a state of the regulator circuit 48. Next, starter 17 is engaged to the engine 13 by changing a starting circuit 45, such as by turning a key in a key switch 39 of the switching circuit 49, which is a portion of the starter circuit 45. Engine 13 is then started. The battery 18 may be charged with power originating from engine 13 via electrical connection to an alternator 15 via charging circuit 44. After going through an initialization procedure, all of the electrical devices 61-64 may be capable of receiving power from the two wire power and data bus 41. In addition, after the system is up, information may be communicated from a first electrical device (e.g. 22) to a second electrical device (e.g. 64d) via signals transmitted over the two wire power and data bus 41.

Much of the startup procedures are accommodated, in the present example, by the main power module 38, which may consist of a combination of already existing Caterpillar Inc. technology. For instance, key switch 39 may be a discrete input to the main wire power module 38 that is separate from the two wire power and data bus 41 which is similar to today's key switch circuit that is fed into a transmission electronic control module on existing machines. Separating the key signal allows one to minimize the number of ECM's in a sleep state, and also allows one to feel a conventional key operation as the discrete signals awaken the two wire power and data bus 41 in the key on position, using the main power module 38. The two wire power and data bus 41 may originate from main power modules 38 similar to today's voltage converters that are used on Caterpillar Inc. machines. The power would come from the batteries and be regulated to the needs of the machine 10. The main power module 38 can also drive the starter solenoid similar to the way that current transmission electronic control modules do on some of today's Caterpillar Inc. machines. The main starter motor 17 will be driven straight from the batteries 18 as has long been conventional. The alternator 15 may be on a stand alone charging circuit 44 similar to today's machines. For the present disclosure it would be no different. The alternator 15 would be hooked directly to the battery 18.

During start up, each smart connector 79 on the two wire power and data bus 41 will be powered on and begin looking for the best frequencies to transmit on between 4.5 MHz and 21 MHz. In that range of frequencies, a potential maximum of 84 carriers on separated frequencies may be created and used to send the messages form one smart connector 79 to another smart connector 79 securely. Several codes may be used singularly or in tandem depending upon the signal integrity, to transmit messages across the frequencies on the two wire power and data bus 41. The codes may actually construct the message from the modulation on the frequency over the two wire power and data bus 41. Among these codes include Convulsion codes, data interleaving, Viterbi, Turbo code and Reed-Solomon Code. The links to the two wire power and data bus 41 provided by the separate smart connectors 79 may be managed by the electronic control module that is a portion of the main power module 38, and it may link the specific addresses that need to be communicated. Each time a link is established, the frequency look procedure may be re-executed.

Once every electrical device 62-64, other than the basic electrical devices 61, has found a suitable transmitting frequency to start with the two wire power and data bus 41 becomes live and ready to work. After that, the transmittal frequencies may be constantly monitored and selected by the main power module 38 to reduce processor load and error correction. Depending upon the amount of noise on the two wire power and data bus 41 and the importance of a particular message, different error correction can be employed singularly or in tandem for each carrier, sometimes using multiple carriers to verify the correction and message. Among these are differential binary phase shift keying, differential quadrature phase shift keying, power line carrier specific and/or orthogonal frequency division multiplexing. Next, the power line carrier chips 91 associated with the driver electrical connectors 63 and the sensor electrical connector 62 may begin receiving J1939 protocol like messages from their associated microprocessors 231 and 212 respectively. This information may then be transposed and transmitted onto the two wire power and data bus 41 through the respective inductive toroid 94 associated with the respective power line communication chips 91. A communication electrical connector 89 will already be linked to a device that already has its own processor (e.g. ECM) and can produce messages for the two wire power and data bus. Each power line communication chip 91 for the communication electrical connectors 89 will just have to transpose those messages on the two wire power and data bus 41 with its specific address. Thus, information may be communicated over the two wire power and data bus 41 by conveying the information as part of a first digital message from a first electrical device 62-64 to a first smart connector 79. That information can be conveyed as a first power line carrier message by the first smart connector 79 onto the two wire power data bus 41. The power line carrier message may include identifying information associated with a second electrical device 62-64. That identifying information may include the specific address stored in the memory 93 of the smart connector 79 that is electrically connected to the second electrical device 62-64 via the two wire power data bus 41. Because all of the power line carrier messages are available to all of the smart connectors that are connected to the two wire power and data bus 41, each smart connector 79 may determine whether a specific power line carrier message includes the specific address stored in its respective memory 93. After receiving a power line carrier message, the power line communication chip 91 may determine whether the carrier message is reliable. This may be accomplished, for example, by counting the number of identical messages that have been received on the 84 different frequencies being utilized. If a sufficient number of those messages prove to be identical, the message is deemed reliable. After receiving the power line carrier message, it may be unwrapped to identify the first digital message, and that may be transmitted to the attached electrical device 62-64 as a second digital message, which may be identical to the originating first digital message, and may be in one of the suitable known protocol, such as J1939, CAN or Flexray. One specific example might be, for instance, to activate the horn of the machine 10. This might be initially accomplished by an operator pushing an appropriate horn button associated with steering wheel 24. An electronic control module associated with the steering wheel 24 would receive that information and convert it into, for instance, a J1939 message directing the machine horn to turn on. That message is then conveyed to the power line communication chip 91 of the associated smart connector 79 where it is converted into a power line carrier message. An example of power line carrier message may include the complete J1939 message wrapped with a particular address associated, for instance, in this case with the horn. When the driver electrical connector 88 associated with the horn identifies the power line carrier message as having its specific address stored in its memory 93, it unwraps the power line carrier message and transmits what may be an identical earlier J1939 message to the microprocessor 231 of the driver electrical connector 88. Microprocessor 231 then performs in a conventional manner to activate the output driver and power the horn in a conventional manner. Thus, from the perspective of the electrical devices 61-64, they see no difference in their respective wiring and operation. However, all of the various wires associated with wiring harnesses of the past are replaced with the special group of connectors 86-89 and the two wire power and data bus 41.

It will be apparent to those skilled in the art that various modifications and variations can be made in the system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A power and data delivery system, comprising:
a conductor for transferring both power and data;
a plurality of device connectors, wherein each of the plurality of device connectors define at least one of a power link and a communication link; and
a plurality of smart connectors connecting the conductor with the plurality of device connectors;
wherein each of the plurality of smart connectors includes a memory having a device testing algorithm stored thereon, and a processor configured to execute the device testing algorithm, wherein the device testing algorithms of the plurality of smart connectors are executed simultaneously;
wherein the device testing algorithms are configured to evaluate a plurality of characteristics associated with one or both of the power link and the communication link, wherein the plurality of characteristics include a current and a voltage.

2. The power and data delivery system of claim 1, further including a power supply operably connected to the conductor, and at least one electrical device connected to each of the plurality of device connectors.

3. The power and data delivery system of claim 2, wherein the plurality of smart connectors include basic connectors, sensor electrical connectors, driver electrical connectors, and communication electrical connectors.

4. The power and data delivery system of claim 1, wherein the memory of each of the plurality of smart connectors has a plurality of expected values stored thereon, and the processor of each of the plurality of smart connectors is further configured to sequentially determine a test value associated with each of the plurality of characteristics based on the device testing algorithm, compare the test value to one of the expected values, and store an evaluation result associated with the test value in the memory.

5. The power and data delivery system of claim 4, wherein the plurality of characteristics also include a resistance and a data link message.

6. The power and data delivery system of claim 4, wherein the plurality of expected values for at least one of the plurality of smart connectors are different than the plurality of expected values for at least another of the plurality of smart connectors.

7. The power and data delivery system of claim 4, wherein the processor of each of the plurality of smart connectors is further configured to execute the device testing algorithm a plurality of times, store the evaluation results associated with each of the plurality of times in the memory, identify a trend associated with the evaluation results, and store an additional evaluation result associated with the trend in the memory.

8. The power and data delivery system of claim 1, wherein the memory of each of the plurality of smart connectors has a first expected signature stored thereon, and the processor of each of the plurality of smart connectors is further configured to determine a first dynamic signature related to at least one characteristic of the plurality of characteristics based on the device testing algorithm, compare the first dynamic signature to the first expected signature, identify a trend associated with the first dynamic signature, and store an evaluation result associated with the trend in the memory.

9. A machine, comprising:
a frame;
an electronically controlled engine mounted on the frame, and being operably coupled to an alternator;
a battery supported on the frame and being electrically connected to the alternator by a charging circuit;
a starter operably coupled to the engine and electrically connected to the battery by a starter circuit;
a conductor for transferring both power and data supported by the frame, and being electrically connected to the battery by a regulator circuit; and
a plurality of electrical devices, wherein each of the plurality of electrical devices is electrically connected to the conductor by a device connector and a smart connector, wherein the device connector defines at least one of a power link and a communication link;
wherein each smart connector includes a memory having a device testing algorithm stored thereon, and a processor configured to execute the device testing algorithm, wherein the device testing algorithms are executed simultaneously;
wherein the device testing algorithms are configured to evaluate a plurality of characteristics associated with one or both of the power link and the communication link, wherein the plurality of characteristics include a current and a voltage.

10. The machine of claim 9, wherein the memory of each smart connector has a plurality of expected values stored thereon, and the processor of each smart connector is further configured to sequentially determine a test value associated with each of the plurality of characteristics based on the device testing algorithm, compare the test value to one of the expected values, and store an evaluation result associated with the test value in the memory.

11. The machine of claim 10, wherein the plurality of characteristics also include a resistance and a data link message.

12. The machine of claim 10, wherein the plurality of expected values for at least one smart connector are different than the plurality of expected values for at least another smart connector.

13. The machine of claim 10, wherein the processor of each smart connector is further configured to execute the device testing algorithm a plurality of times, store the evaluation results associated with each of the plurality of times in the memory, identify a trend associated with the evaluation results, and store an additional evaluation result associated with the trend in the memory.

14. The machine of claim 9, wherein the memory of each smart connector has a first expected signature stored thereon, and the processor of each smart connector is further configured to determine a first dynamic signature related to at least one characteristic of the plurality of characteristics based on the device testing algorithm, compare the first dynamic signature to the first expected signature, identify a trend associated with the first dynamic signature, and store an evaluation result associated with the trend in the memory.

15. The machine of claim 9, wherein the plurality of smart connectors include basic connectors, sensor electrical connectors, driver electrical connectors, and communication electrical connectors.

16. A method of operating a machine, comprising the steps of:
electrically connecting a battery to a conductor by changing a regulator circuit from an open state to a closed state, wherein the conductor is configured to transfer both power and data;
changing a starting circuit from an open state to a closed state to engage a starter to an engine of the machine;

starting the engine of the machine;

charging the battery with power from a charging circuit electrically connected to an alternator coupled to the engine;

powering each of a plurality of electrical devices with electrical power from the conductor through a respective smart connector and a respective device connector; and simultaneously executing a device testing algorithm on each smart connector;

wherein the simultaneously executing step includes evaluating a plurality of characteristics associated with one or both of a power link and a communication link of the respective device connector, wherein the plurality of characteristics include a current and a voltage.

17. The method of claim 16, wherein the simultaneously executing step includes sequentially determining a test value associated with each of the plurality of characteristics based on the device testing algorithm, comparing the test value to one of a plurality of expected values stored in a memory of each smart connector, and storing an evaluation result associated with the test value in the memory.

18. The method of claim 17, further including executing the device testing algorithm a plurality of times, storing the evaluation results associated with each of the plurality of times in the memory, identifying a trend associated with the evaluation results, and storing an additional evaluation result associated with the trend in the memory.

19. The method of claim 16, wherein the simultaneously executing step includes determining a first dynamic signature related to at least one characteristic of the plurality of characteristics based on the device testing algorithm, comparing the first dynamic signature to a first expected signature stored in a memory of each smart connector, identifying a trend associated with the first dynamic signature, and storing an evaluation result associated with the trend in the memory.

20. The method of claim 16, further including transferring data between a subset of the plurality of electrical devices and the respective smart connector using the respective device connector.

* * * * *